United States Patent
Nag et al.

(10) Patent No.: US 12,459,539 B1
(45) Date of Patent: Nov. 4, 2025

(54) METHODS AND APPARATUS FOR ASSESSING SCENES

(71) Applicant: Nuro, Inc., Mountain View, CA (US)

(72) Inventors: Sreeja Nag, San Bruno, CA (US); Sarah Marie Thornton, Pacifica, CA (US)

(73) Assignee: NURO, INC., Mountain View, CA (US)

( * ) Notice: Subject to any disclaimer, the term of this patent is extended or adjusted under 35 U.S.C. 154(b) by 285 days.

(21) Appl. No.: 17/897,646

(22) Filed: Aug. 29, 2022

Related U.S. Application Data

(60) Provisional application No. 63/238,631, filed on Aug. 30, 2021.

(51) Int. Cl.
*B60W 60/00* (2020.01)
*B60W 50/00* (2006.01)

(52) U.S. Cl.
CPC .... *B60W 60/0015* (2020.02); *B60W 50/0098* (2013.01); *B60W 2050/0022* (2013.01);
(Continued)

(58) Field of Classification Search
CPC ......... B60W 60/0015; B60W 50/0098; B60W 2554/402; B60W 2552/00; B60W 2556/40; B60W 2556/45; B60W 2554/406; B60W 2554/80; B60W 2554/4046; B60W 2050/0022; B60W 2520/10
(Continued)

(56) References Cited

U.S. PATENT DOCUMENTS

2019/0146492 A1\* 5/2019 Phillips ................ G05B 13/041
701/23
2020/0307586 A1\* 10/2020 Patel ............... B60W 60/00276
(Continued)

FOREIGN PATENT DOCUMENTS

WO    WO-2021245201 A1 \* 12/2021    .......... G06F 11/3698

OTHER PUBLICATIONS

Mubbasir Kapadia, Scenario Space: Characterizing Coverage, Quality, and Failure of Steering Algorithms, Aug. 7, 2011, Association for Computing Machinery, Inc. Eurographics/ ACM SIGGRAPH Symposium on Computer Animation (Year: 2011).\*
(Continued)

*Primary Examiner* — Matthias S Weisfeld
(74) *Attorney, Agent, or Firm* — Edell, Shapiro & Finnan, LLC

(57) ABSTRACT

According to one aspect, methods to validate an autonomy system using scenes of various complexities are provided. A computing device obtains a plurality of scenes. Each of the plurality of scenes represents an environment in which a vehicle is driven for a predetermined time. The computing device determines a complexity of each of the plurality of scenes based on characteristics of a respective scene and at least one maneuver required from an autonomous driving system to drive the vehicle through the respective scene without a collision. The computing device calculates a complexity score for each of the plurality of scenes based on the complexity determined for the respective scene and validates the autonomous driving system for driving the vehicle using a subset of the plurality of scenes selected based on the complexity score.

20 Claims, 16 Drawing Sheets

(52) U.S. Cl.
CPC ..... *B60W 2520/10* (2013.01); *B60W 2552/00* (2020.02); *B60W 2554/402* (2020.02); *B60W 2554/4046* (2020.02); *B60W 2554/406* (2020.02); *B60W 2554/80* (2020.02); *B60W 2556/40* (2020.02); *B60W 2556/45* (2020.02)

(58) Field of Classification Search
USPC .......................................................... 701/24
See application file for complete search history.

(56) References Cited

U.S. PATENT DOCUMENTS

| | | | |
|---|---|---|---|
| 2020/0342652 A1* | 10/2020 | Rowell ................. | G06V 10/82 |
| 2021/0125001 A1* | 4/2021 | Guo ....................... | G06F 16/55 |
| 2021/0403034 A1* | 12/2021 | Lapin ................ | B60W 60/0027 |
| 2022/0297682 A1* | 9/2022 | Javaid .................. | B60W 30/09 |
| 2022/0319323 A1* | 10/2022 | Lv ........................... | G08G 1/16 |
| 2022/0348211 A1* | 11/2022 | Hofbauer ........... | G01C 21/3811 |

OTHER PUBLICATIONS

Huang, "End-to-end Methods for Autonomous Driving in Simulation," https://www.ri.cmu.edu/wp-content/uploads/2021/08/MSR_thesis-1.pdf, Aug. 5, 2021, 88 pages.

* cited by examiner

| | RANGE |
|---|---|
| NOMINAL | <33 |
| CHALLENGE | 33-66 |
| COMPLICATED | 67-100+ |

FIG.9

METHODS AND APPARATUS FOR ASSESSING SCENES

CROSS REFERENCE TO RELATED APPLICATION

This application claims priority under 35 U.S.C. § 119(e) to U.S. Provisional Application No. 63/238,631, filed Aug. 30, 2021, entitled "Methods and Apparatus for Assessing Scenes," the entirety of which is incorporated herein by reference.

TECHNICAL FIELD

The disclosure relates to autonomous vehicles. More particularly, the disclosure relates to assessing readiness for deployment and performance of autonomous systems.

BACKGROUND

As the use of autonomous or self-driving vehicles grows, the need to accurately assess autonomous systems used to control the vehicles is becoming increasingly important. When autonomous systems are inaccurately assessed, vehicles using the autonomous systems may pose safety threats.

Determining whether an autonomous system may be used safely is generally based, at least in part, upon how an autonomous system may react when exposed to certain scenarios or scenes. For example, an autonomous system may be determined to be ready for deployment, i.e., in an autonomous vehicle, when the autonomous vehicle has been repeatedly tested in scenarios which may be complicated. The ability to efficiently and effectively assess whether an autonomous system is considered to be safe for deployment with respect to a vehicle allows for prudent decisions to be made.

BRIEF DESCRIPTION OF THE DRAWINGS

FIG. 9 is a view illustrating complexity score ranges for characterizing scenes, according to an example embodiment.

DESCRIPTION OF EXAMPLE EMBODIMENTS

Overview

Figure 1:
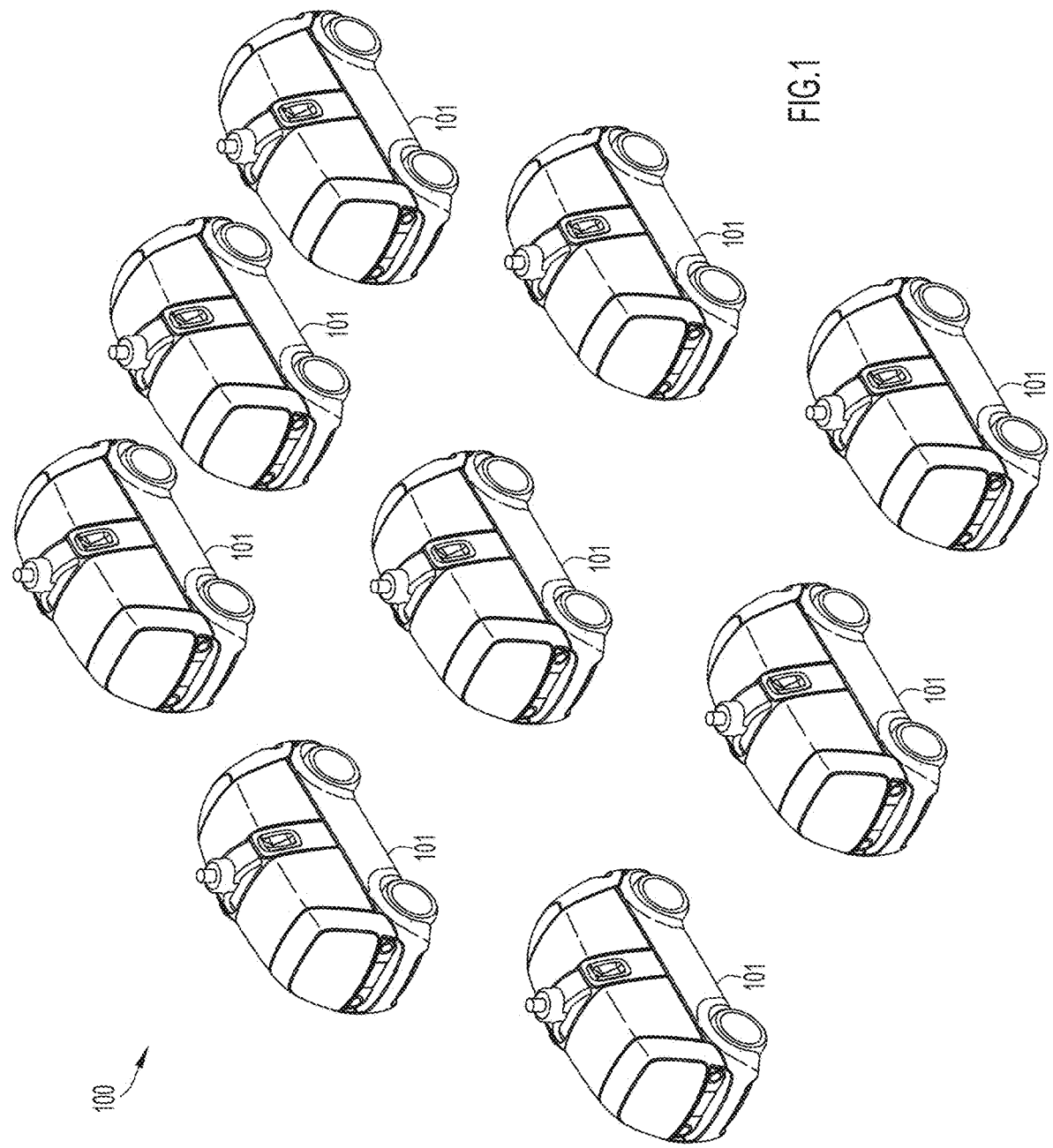
FIG. 1 is a diagram of an autonomous vehicle fleet in which an autonomy system for driving an autonomous vehicle in the fleet is validated based on scene characterization, according to an example embodiment.

Methods are provided for characterizing various scenes based on their complexities to validate an autonomous driving system (autonomy system and/or simulation system) for driving a vehicle.

In one embodiment, a computing device obtains a plurality of scenes. Each of the plurality of scenes represents an environment in which a vehicle is driven for a predetermined time. The computing device determines a complexity of each of the plurality of scenes based on characteristics of a respective scene and at least one maneuver required from an autonomous driving system to drive the vehicle through the respective scene without a collision. The computing device further calculates a complexity score for each of the plurality of scenes based on the complexity determined for the respective scene and validates the autonomous driving system for driving the vehicle using a subset of the plurality of scenes selected based on the complexity score.

EXAMPLE EMBODIMENTS

When validating systems for use with autonomous vehicles, the systems are effectively tested with meaningful data. For example, when essentially validating the safety with which an autonomy system may operate, the ability to test the autonomy system with scenes or scenarios which are considered to be difficult may increase confidence that the autonomy system may perform safely.

An autonomous driving system may be a system configured to autonomously control and/or drive the autonomous vehicle (vehicle). The autonomous driving system includes an autonomy system that may be incorporated inside the autonomous vehicle. The autonomy system may include a sensor system configured to sense an environment surrounding the autonomous vehicle and a controller and a processor, coupled to the sensor system, configured to control operation of the autonomous vehicle and to perform various operations.

The autonomous driving system may be a simulation system that tests control of the autonomous vehicle in a simulation or virtual environment. That is, simulation systems may generally be used to validate autonomy systems. A simulation system may simulate the behavior of an autonomy system across a multitude of different real-world scenes, scenarios, and/or situations. That is, a simulation system allows different autonomy-related algorithms to be tested with different real-world driving scenes to substantially ensure that once the autonomy system is deployed on a vehicle, the vehicle may operate safely and reliably. A relatively large number of different scenes, scenarios, and/or situations may be tested. Such scenes, scenarios, and/or situations may include, but are not limited to, different roads, different driving conditions, different traffic conditions, different obstacles, etc.

By characterizing scenes which are used by an autonomous driving system, e.g., for purposes of validating a system, the validation of the autonomous driving system may be improved. When an autonomous driving system meets specifications, e.g., meets at least a predetermined threshold for safety, then the indication may be that the autonomy system may be safely deployed on a vehicle.

The characterized scenes may effectively serve as training data or sets with substantially quantified levels of difficulty for an autonomous driving system. The ability to identify relatively difficult scenes may enhance the performance of an autonomous driving system. For example, if an autonomous driving system is effectively tested using scenes characterized as being relatively difficult, there may be increased confidence that the autonomous driving system is able to navigate or otherwise perform well in difficult situations, e.g., may independently control and drive the vehicle safely to avoid collision(s). In addition, when an autonomous driving system uses scenes characterized as being relatively difficult, the ability to navigate difficult situations may be enhanced and improved using various simulations, for example. Moreover, the coverage of operational design domains (ODDs) may be assessed, and the exposure to ODD-related risks may be evaluated.

In one example embodiment, scenes may be characterized in terms of a breadth and a depth or, more generally, complexity. The breadth of a scene may refer to a context associated with the scene, while the depth of a scene may refer to a difficulty of context associated with the scene. Breadth may effectively characterize which types of situations or objects are present in a scene, and depth may effectively characterize a number of situations or objects present in the scene. For example, breadth may refer to a general presence of objects such as other vehicles in a scene, while depth may refer to a number of vehicles in the scene and, in some instances, the activities that the vehicles are engaged in (i.e., difficulty of interaction between agents and objects).

A system which evaluates a difficulty and/or complexity associated with a scene may be associated with autonomous vehicles, e.g., a fleet of autonomous vehicles. Referring initially to FIG. 1, an autonomous vehicle fleet will be described in accordance with an example embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
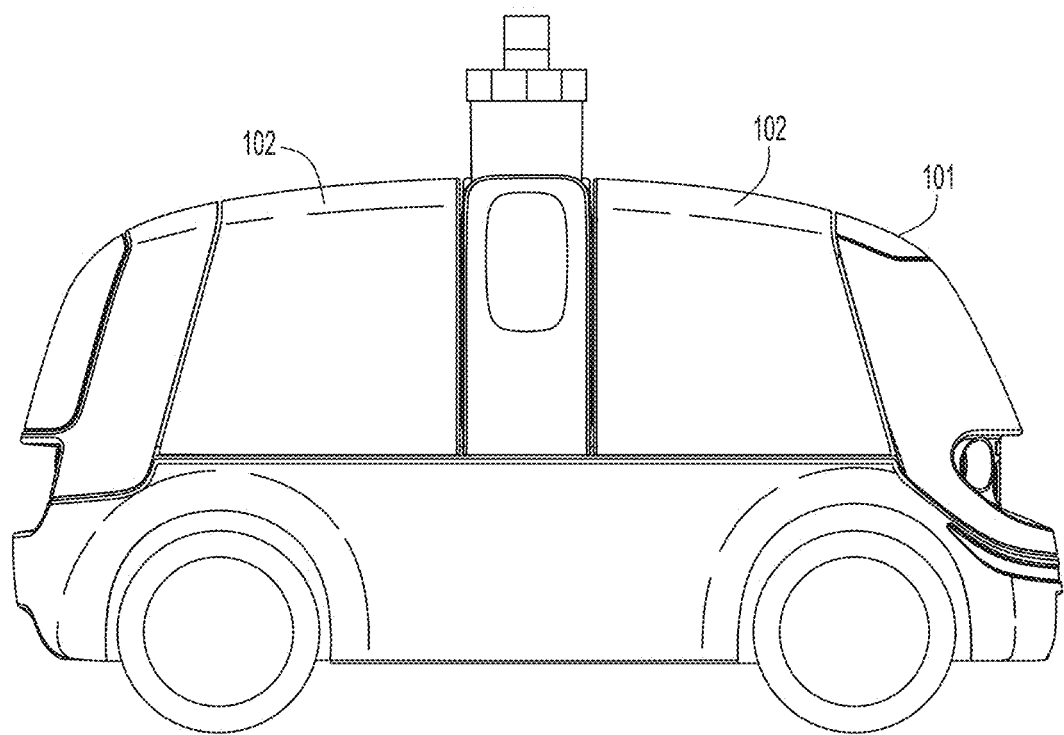
FIG. 2 is a diagram of an autonomous vehicle being driven using an autonomy system that is validated based on scene characterization, according to an example embodiment.

FIG. 2 is a diagram of an autonomous vehicle, e.g., one of autonomous vehicles 101 of FIG. 1, in accordance with an example embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
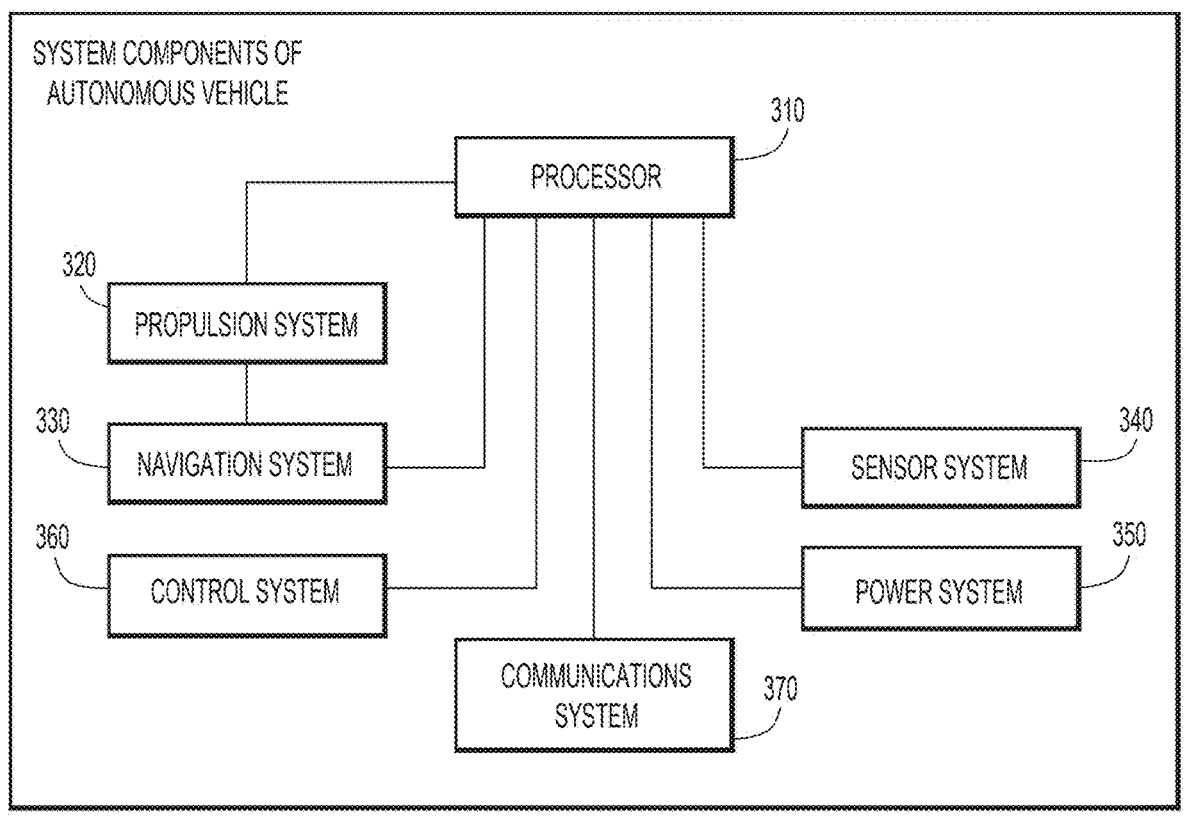
FIG. 3 is a block diagram of various components of an autonomous vehicle, according to an example embodiment.

FIG. 3 is a block diagram of an autonomous vehicle, e.g., autonomous vehicle 101 of FIG. 1, in accordance with an example embodiment. An autonomous vehicle 101 includes system components 300. The system components 300 include a processor 310, a propulsion system 320, a navigation system 330, a sensor system 340, a power system 350, a control system 360, and a communications system 370. It should be appreciated that processor 310, propulsion system 320, navigation system 330, sensor system 340, power system 350, and communications system 370 are all coupled to a chassis or body of autonomous vehicle 101.

Processor 310 is arranged to send instructions to and to receive instructions from or for various components such as propulsion system 320, navigation system 330, sensor system 340, power system 350, and control system 360. Propulsion system 320, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 320 may be arranged to cause the engine, wheels, steering, and braking systems to cooperate to drive. In general, propulsion system 320 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 330 may control propulsion system 320 to navigate autonomous vehicle 101 through paths and/or within unstructured open or closed environments. Navigation system 330 may include at least one of digital maps, street view photographs, and a global positioning system (GPS) point. Maps, for example, may be utilized in cooperation with sensors included in sensor system 340 to allow navigation system 330 to cause autonomous vehicle 101 to navigate through an environment.

Sensor system 340 includes any sensors, as for example LiDAR, radar, ultrasonic sensors, microphones, altimeters, and/or cameras. Sensor system 340 generally includes onboard sensors which allow autonomous vehicle 101 to safely navigate, and to ascertain when there are objects near autonomous vehicle 101. In one embodiment, sensor system 340 may include propulsion systems sensors that monitor drive mechanism performance, drive train performance, and/or power system levels. Data collected by sensor system 340 may be used by a perception system associated with navigation system 330 to determine or to otherwise understand an environment around autonomous vehicle 101.

Power system 350 is arranged to provide power to autonomous vehicle 101. Power may be provided as electrical power, gas power, or any other suitable power, e.g., solar power or battery power. In one embodiment, power system 350 may include a main power source, and an auxiliary power source that may serve to power various components of autonomous vehicle 101 and/or to generally provide power to autonomous vehicle 101 when the main power source does not have the capacity to provide sufficient power.

Communications system 370 allows autonomous vehicle 101 to communicate, as for example, wirelessly, with a fleet management system (not shown) that allows autonomous vehicle 101 to be controlled remotely. Communications system 370 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, the communications system 370 may further be configured to communicate with a scene characterization system. The communications system 370 may provide simulation data, described below, and/or receive various scenes from the scene characterization system for validation. Communications supported by communications system 370 may include, but are not limited to including, cellular communications such as 3G/4G/5G and/or LTE communications and other network communications, e.g., Wi-Fi® or Bluetooth® wireless communication techniques.

In some embodiments, control system 360 may cooperate with processor 310 to determine where autonomous vehicle 101 may safely travel, and to determine the presence of objects in a vicinity around autonomous vehicle 101 based on data, e.g., results, from sensor system 340. In other words, control system 360 may cooperate with processor 310 to effectively determine what autonomous vehicle 101 may do within its immediate surroundings. Control system 360 in cooperation with processor 310 may essentially control power system 350 and navigation system 330 as part of driving or conveying autonomous vehicle 101. Additionally, control system 360 may cooperate with processor 310 and communications system 370 to provide data to or obtain data from other autonomous vehicles 101, a management server, a global positioning server (GPS), a personal computer, a teleoperations system, a smartphone, or any computing device via a communication module such as communications system 370. In general, control system 360 may cooperate at least with processor 310, propulsion system 320, navigation system 330, sensor system 340, and power system 350 to allow vehicle 101 to operate autonomously. That is, autonomous vehicle 101 is able to operate autonomously through the use of an autonomy system that effectively includes, at least in part, functionality provided by propulsion system 320, navigation system 330, sensor system 340, power system 350, and control system 360. Components of propulsion system 320, navigation system 330, sensor system 340, power system 350, and control system 360 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 340 may be processed such that the environment around autonomous vehicle 101 may effectively be perceived.

As will be appreciated by those skilled in the art, autonomous vehicle 101 may be referred to as an ego vehicle, a subject vehicle, or a vehicle and may be a representation of an autonomous vehicle that is being tested or otherwise exposed to a scene.

To validate or to otherwise test autonomous driving system, scenes or scenarios may be analyzed to substantially characterize the scenes. The characterized scenes may then be searched to identify scenes that meet a particular criterion or multiple criteria. To facilitate searching of characterized scenes, the characterized scenes may be indexed and stored in a searchable database. By way of example, each characterized scene may have an associated score, and the scores associated with characterized scenes may be indexed to enable searching based on scores. As mentioned above, the scenes may be characterized based at least in part upon a complexity of a scene. More generally, a scene may be characterized based on, but is not limited to being based, breadth and depth of the scene. In other words, each scene which may be used to validate autonomous driving systems may be characterized in terms of a breadth and a depth, e.g., a context and a difficulty level.

Once a scene is characterized, a scoring function may be used to generate a score for the scene. Using the score enables a selection to be made for scenes of certain levels when evaluating autonomous driving systems. Using the scoring function for the scenes, the autonomous driving systems may be evaluated for different types of exposures and/or conditions on the road. For example, assessments of an autonomous driving system relating to coverage of ODDs and exposure to ODD-related risks may effectively be made.

Further, using characterization of the scenes (complexity and/or scores) gaps in assessing performance of autonomous driving system may easily be identified. Using scene characterization, training of autonomous driving systems is further improved via a feedback loop. For example, if autonomous driving system fails to safely drive through a scene with a particular breadth and depth and/or complexity or difficulty score, more scenes (a subset of scenes) of the same type and/or complexity or difficulty score range may then be used to further train the autonomous driving system until performance becomes satisfactory (about a predetermined threshold value).

As will be appreciated by those skilled in the art, characterizing the scenes improves performance, training, and testing of an autonomous vehicle i.e., autonomous driving system for the vehicle.

Figure 4:
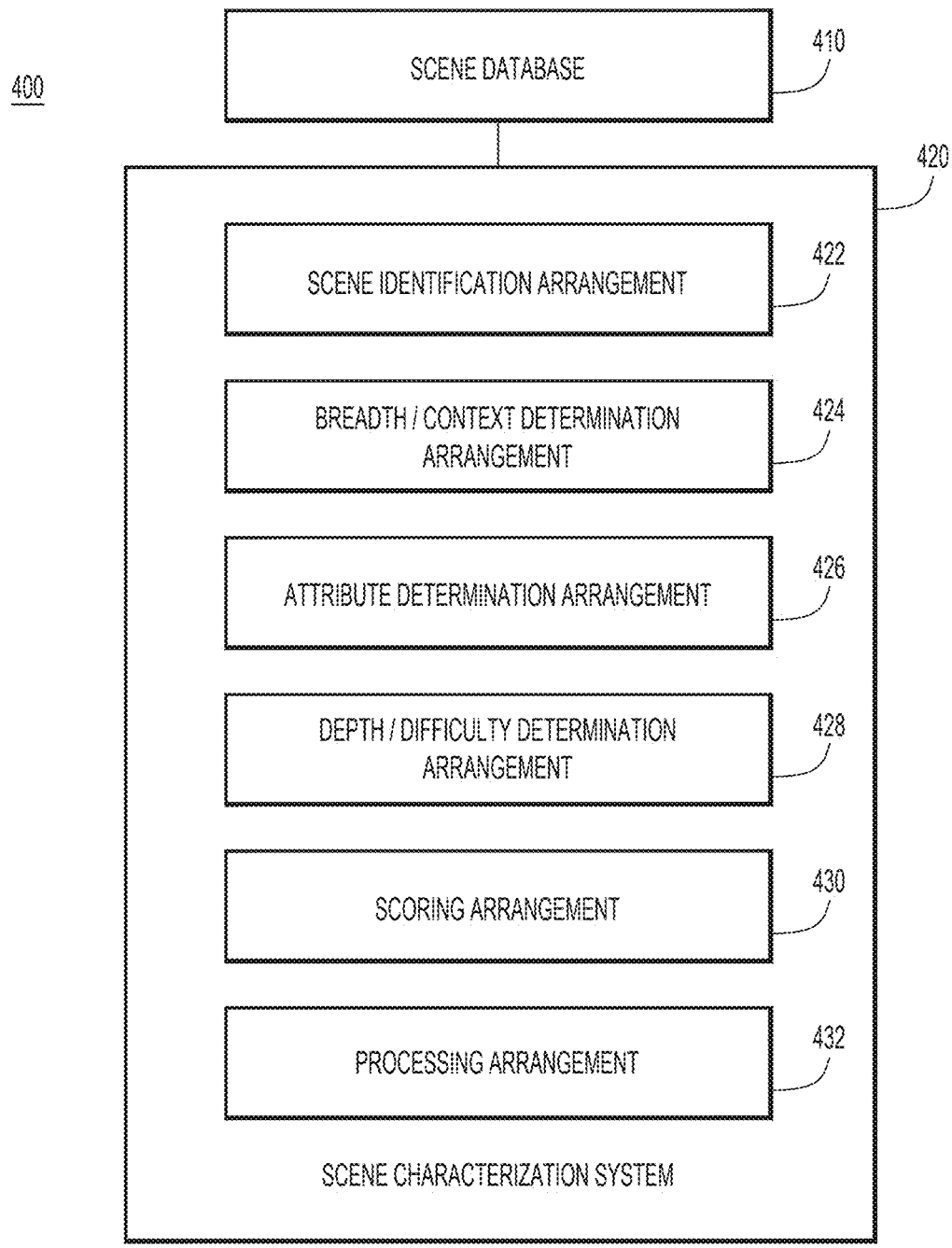
FIG. 4 is a block diagram of a system configured to assess the complexity of a scene or a scenario, according to an example embodiment.

FIG. 4 is a block diagram illustrating a system 400 for assessing complexity of a scene, according to an example embodiment. The system 400, which may be a computing system associated with an enterprise, includes a scene database 410 and a scene characterization system 420. The system 400 may include one or more servers and/or computing devices such as a computing device of FIG. 15.

The scene database 410 is a memory or an external storage such as one or more databases. The scene database 410 stores environment data of real-world environments and/or simulation (virtual) environments. The environment data includes, but is not limited to, scenarios, situations, scenes that may be encountered by a deployed autonomous vehicle. For example, environment data may include videos of actual environments and/or videos of simulated environments.

Environment data may include driving logs of a vehicle driven in a real-world and/or simulated environment. In one example, the environment data includes a plurality of scenes that represent an environment in which a vehicle is driven for a predetermined time. Typically, a scene is short in duration e.g., 15-25 seconds. Some non-limiting examples of a scene include an intersection along a path an autonomous vehicle is traveling, a portion of a local road, a portion of a highway, an intersection, etc. The environment data may be raw data from a driving log, for example, and/or indexed scenes. The environment data may be used to validate or otherwise train an autonomous driving system associated with autonomous vehicles. The scene database 410 may store raw data and indexed scenes.

Scene characterization system 420 obtains a plurality of scenes from the scene database 410, processes the plurality of scenes such that the scenes may be characterized and/or scored, and stores the characterized scenes in the scene database 410. In one example, characterized scenes may be stored in scene database 410 in an indexable manner such that scenes may be readily searched, e.g., using scene complexity or complexity/difficulty score.

Scene characterization system 420 generally includes a scene identification arrangement 422, a breadth/context determination arrangement 424, an attribute determination arrangement 426, a depth/difficulty determination arrangement 428, a scoring arrangement 430, and a processing arrangement 432. One or more of these arrangements (scene identification arrangement 422, breadth/context determination arrangement 424, attribute determination arrangement, depth/difficulty determination arrangement 428, scoring arrangement 430) may include hardware and/or software logic devices configured to be executed by processing arrangement 432 e.g., one or more processors.

Scene identification arrangement 422 is configured to identify components, objects, and/or characteristics in scenes obtained from scene database 410. In one example, scene identification arrangement 422 creates scenes or snippets from videos stored in scene database 410. That is, scene identification arrangement 422 may be configured to cooperate with scene database 410 to define scenes, e.g., to divide a relatively long video (raw data) into snippets which correspond to scenes of a particular length (predetermined time). The scene identification arrangement 422 may further be configured to index these scenes for faster searches.

Breadth/context determination arrangement 424 is configured to analyze a scene to ascertain what is in the scene, or the context of the scene. The breadth/context determination arrangement 424 parses the scene to determine whether various factors and/or conditions are present in the scene. The breadth/context determination arrangement 424 further parses the scene to determine current operating state of the autonomous vehicle (vehicle). In short, the breadth/context determine arrangement 424 characterizes operational/driving environment in the scene.

Figure 5:
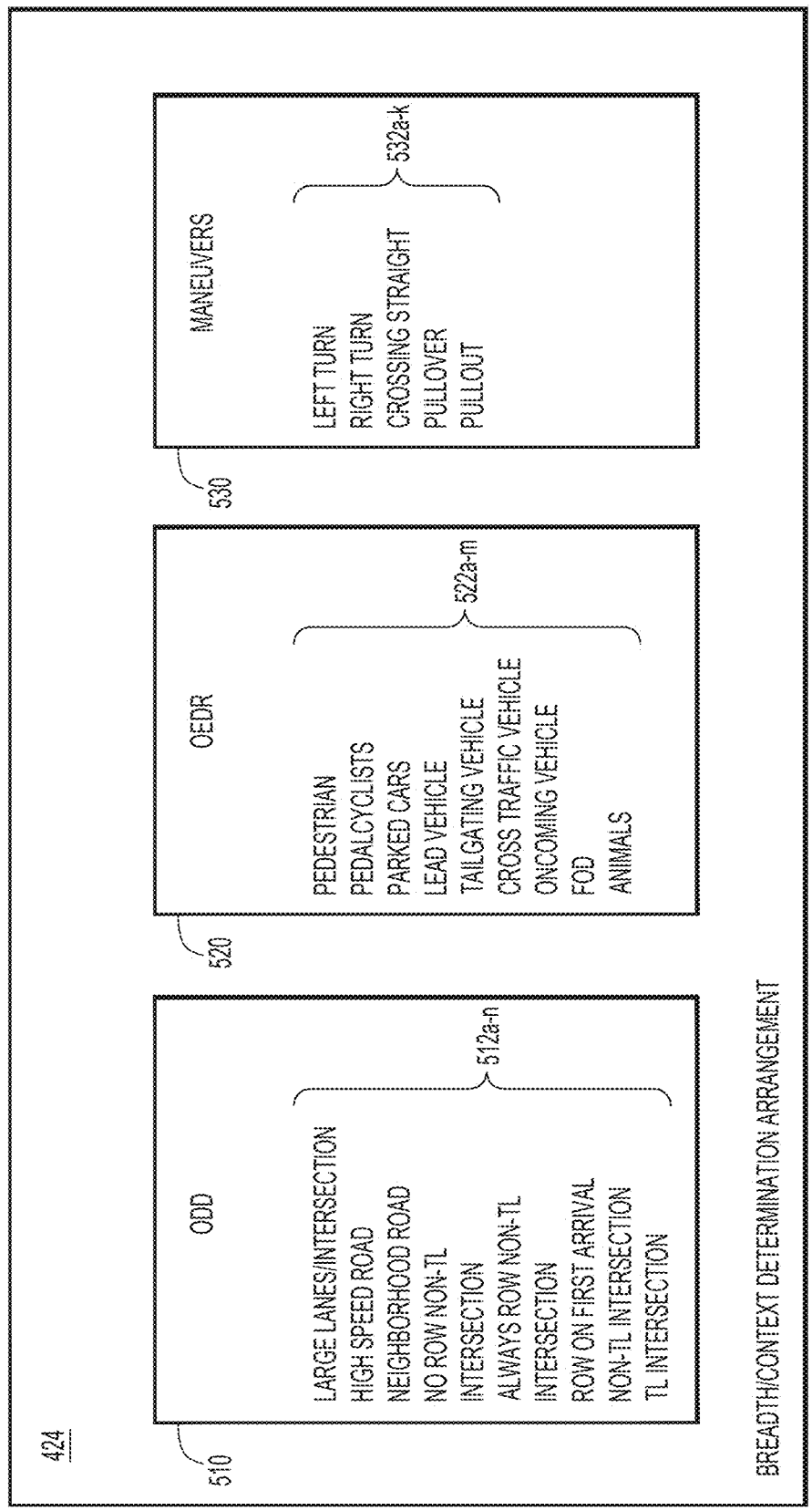
FIG. 5 is a block diagram of a breadth/context determination arrangement of FIG. 4, according to an example embodiment.

Specifically, with continued reference to FIG. 4, FIG. 5 is a block diagram of breadth/context determination arrangement 424, according to an example embodiment. The breadth/context determination arrangement 424 detects whether the scene includes one or more agents. That is, the breadth/context determination arrangement 424 determines one or more of: ODD 510, presence and type of Object and Event Detection and Response (OEDR) 520, and/or maneuvers 530 to be made by a vehicle in the respective scene.

The breadth/context determination arrangement 424 analyzes the scenes to characterize the ODD 510. The ODD 510 represents environmental conditions in which the autonomous driving system is to operate/control the vehicle. The ODD 510 may include, but is not limited to, a particular design such as roadway types, geographic area, speed range, weather, time of day, etc. The ODD 510 may include one or more of environmental conditions 512a-n such as large lanes/intersection, high speed road, neighborhood road, an intersection where the vehicle does not have a right of way (ROW), an intersection that is a non-traffic light (TL) intersection (a stop sign along the path of the vehicle), an intersection where the vehicle always have ROW, an intersection that is a non-TL intersection (a stop sign but not along the path on which the vehicle is traveling), an intersection where the vehicle has ROW on the first arrival, and a non-TL intersection where the vehicle never has a ROW (a four way stop sign), a TL intersection, etc.

The notations "a-n", "a-m", "a-k", "a-j", "a-h", "a-g", "a-p", etc. illustrate that the number of elements/parameters/conditions can vary depending on a particular implementation and is not limited to the number of elements/parameters/conditions being depicted or described.

Additionally, the breadth/context determination arrangement 424 may analyze the scenes to determine presence of the OEDR 520 in the respective scene such as one or more agents of various types 522a-m. For example, breadth/context determination arrangement 424 may determine whether a scene includes static agents, vulnerable road users, moving road agents, and/or other components in the respective scene. Static agents may include, but are not limited to, parked vehicles and/or foreign object debris (FOD). Vulnerable road users may include, but are not limited to, pedestrians, animals and/or pedalcyclists. Moving vehicles may include, but are not limited to, vehicles in cross traffic, vehicles in a lead position, oncoming vehicles, and/or tailgating vehicles.

Moreover, breadth/context determination arrangement 424 may further analyze the scenes to determine whether one or more maneuvers 530 needs to be made by the vehicle to continue along the path safely (without a collision) in the respective scene. The maneuvers 530 may include various types 532a-k including, but not limited to, left turn, right turn, crossing straight (in the event of an intersection), pullover, pullout, etc.

Referring back to FIG. 4, attribute determination arrangement 426 may be configured to cooperate with the breadth/context determination arrangement 424 to determine attributes associated with a respective scene. Attribute determination arrangement 426 determines how each agent and the vehicle detected by the breadth/context determination arrangement 424 is behaving.

Figure 6:
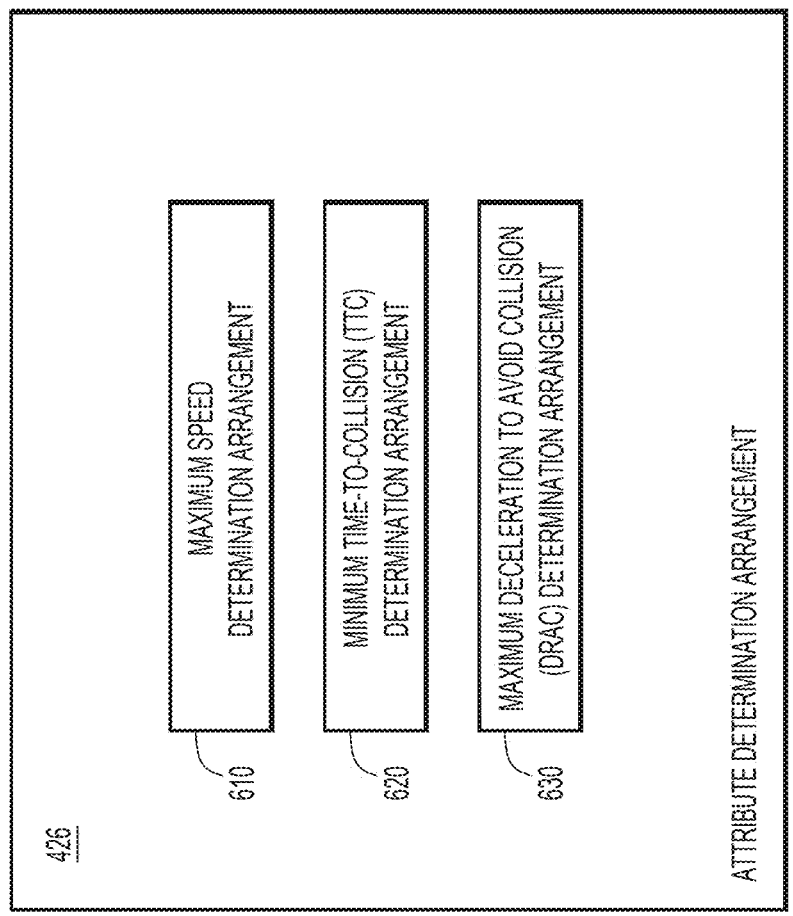
FIG. 6 is a block diagram of an attribute determination arrangement of FIG. 4, according to an example embodiment.

With continued reference to FIG. 4, FIG. 6 is a block diagram illustrating attribute determination arrangement 426, according to an example embodiment. Attribute determination arrangement 426 may be configured to apply an algorithm that includes maximum speed determination arrangement 610, minimum time to collision (TTC) determination arrangement 620, and maximum deceleration to avoid collision (DRAC) determination arrangement 630.

Maximum speed determination arrangement 610 determines a substantially maximum speed that the autonomous vehicle may travel in the respective scene. The substantially maximum speed may be determined based on road conditions and/or environmental conditions determined by breadth/context determination arrangement 424, a speed limit associated with a road, and/or the capabilities of the autonomous vehicle.

Minimum TTC determination arrangement 620 determines, using the maximum speed of the vehicle and distance to a particular agent in the scene, the TTC or substantially minimum TTC for the autonomous vehicle, or an inverse of the substantially minimum TTC for the vehicle and another agent detected by the breadth/context determination arrangement 424. The determination of a minimum TTC may include a prediction of how other agents or users in a scene are likely to act or behave, either on their own or in anticipation of how they may expect the autonomous vehicle to act or behave.

Maximum DRAC determination arrangement 630 determines maximum deceleration required by the vehicle in the scene to avoid a collision based on the maximum speed and the TTC i.e., approximately maximum absolute DRAC. The DRAC may be determined based on how road conditions may affect deceleration and/or how other agents or users in a scene are expected to act or behave.

Furthermore, attribute determination arrangement 426 may determine a number of parallel lanes in existence on a roadway and/or a number of lanes crossed by the autonomous vehicle. Attribute determination arrangement 426 may be arranged to determine attributes and/or characteristics that may generally be used to substantially generate a score for a scene.

Referring back to FIG. 4, substantially minimum TTC and/or substantially maximum DRAC may then be used by depth/difficulty determination arrangement 428 to determine depth and/or difficulty associated with a respective scene. That is, the depth/difficulty determination arrangement 428 is configured to assess difficulty of a plurality of scenes. Given the context of a scene determined by breadth/context determination arrangement 424 and attributes determined by the attribute determination arrangement 426, depth/difficulty determination arrangement 428 may assess complexity of the respective scenes. Depth/difficulty determination arrangement 428 determines how challenging the scene is for the vehicle to safely navigate (without a collision) using the autonomous driving system.

Figure 7:
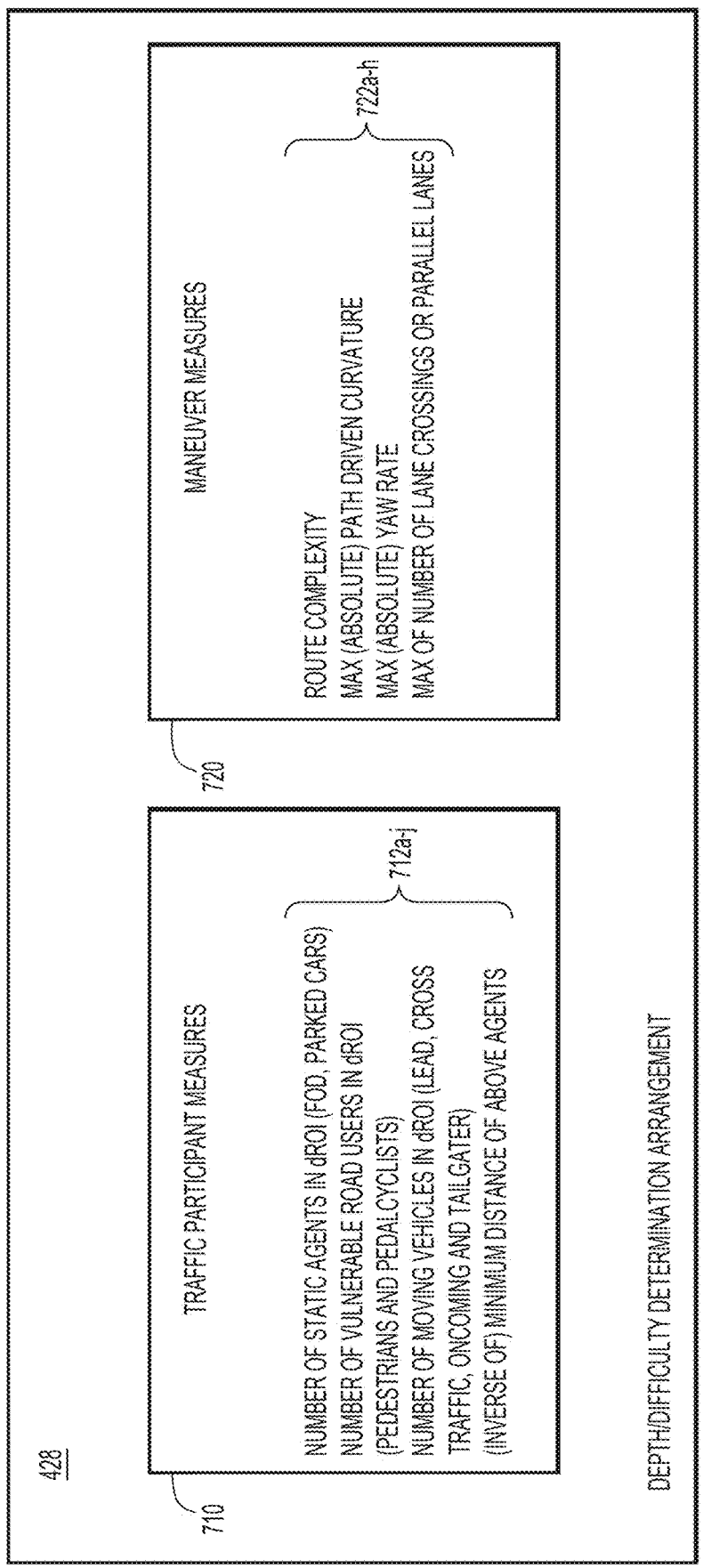
FIG. 7 is a block diagram of a depth/difficulty determination arrangement of FIG. 4, according to an example embodiment.

With continued reference to FIG. 4, FIG. 7 is a block diagram illustrating depth/difficulty determination arrangement 428, according to an example embodiment.

Depth/difficulty determination arrangement 428 determines depth or difficulty of each of the plurality of scenes based on characteristics of the scene and maneuvers required for an autonomous driving system to drive the vehicle through the respective scene without a collision. The difficulty of the respective scene may be based on traffic participant measures 710 and maneuver measures 720 required from the vehicle using the autonomous driving system.

The traffic participant measures 710 may include one or more of: a number for each of the one or more agent types (determined to exist in the respective scene by the breadth/context determination arrangement 424) and (inverse of) a minimum distance between the vehicle and these agents in the respective scene. Some examples of traffic participant characteristics 712a-j of traffic participant measures 710 may include, but not limited to, a number of static agents in the scene (referred to as a dynamic region of interest "dROI"), a number of vulnerable road users in the scene, a number of moving agents in the scene, and/or a minimum distance or inverse thereof between these agents and the autonomous vehicle.

The maneuver measures 720 may define route complexity for the autonomous vehicle to navigate the scene safely (without a collision). The maneuver measures 720 may include, but not limited to, at least one measure value of the at least one maneuver to be made by the vehicle controlled by the autonomous driving system in the respective scene. Some of the route complexity factors 722a-h of the maneuver measures 720 may include, but not limited to, curvatures such as maximum (absolute) path driven curvature, yaw rates (maximum absolute) associated with the route, and number of lane crossing or parallel lanes. The maneuver measures 720 may be obtained based on speed of the vehicle such as a substantially maximum speed, minimum TTC between the vehicle and an agent, and/or maximum DRAC, which were determined by attribute determination arrangement 426.

Referring back to FIG. 4, scoring arrangement 430 is configured to use a breadth determined by breadth/context determination arrangement 424, attributes determined by the attribute determination arrangement 426, and/or a depth determined by depth/difficulty determination arrangement 428, to essentially generate a complexity/difficulty score for a scene.

In one example, scoring arrangement 430 implements a scoring function, e.g., a weighted scoring function, that effectively assigns a score to a scene based on inputs provided by breadth/context determination arrangement 424, attribute determination arrangement 426, and/or depth/difficulty determination arrangement 428. Weights associated with the scoring function may be adjusted based upon the requirements of an enterprise and/or perceived importance of each input provided to the scoring function. The scoring function may be a linear sum such as a linear weighted sum, although it should be appreciated that the scoring function may vary widely.

Scoring arrangement 430 may be configured to calibrate complexity scores for scenes such that the score substantially fall within a range of scores, e.g., between approximately zero and approximately one hundred. Using calibrated complexity/difficulty scores, the plurality of scenes may be divided into various subsets and assigned to a respective complexity category that has a specific score range, as detailed below.

Figure 8:
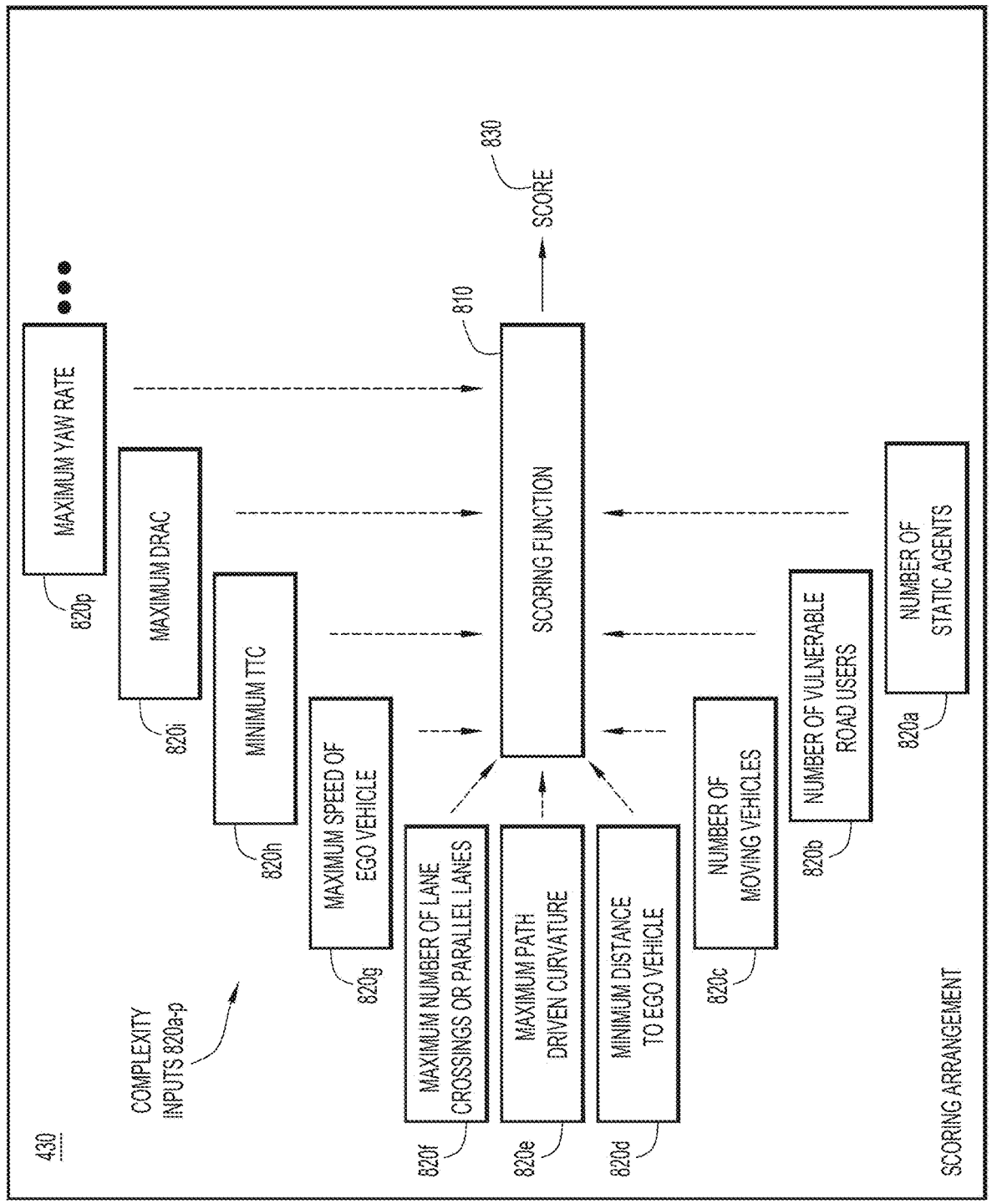
FIG. 8 is a diagram of a scoring arrangement of FIG. 4 with a scoring function configured to generate a score for a scene or a scenario given one or more parameters, according to an example embodiment.

FIG. 8 is a diagram illustrating a scoring arrangement 430 having a scoring function to generate a score for a scene or a scenario given one or more parameters, according to an example embodiment.

A scoring function 810 may generally be executed by scoring arrangement 430. While scoring function 810 may be a linear weighted sum, scoring function 810 is not limited to being a linear weighted sum. Scoring function 810 calculates a complexity score using various parameters or characteristics of the scene as inputs 820a-p.

Inputs 820a-p are obtained from the breadth/context determination arrangement 424, attribute determination arrangement 426, and/or depth/difficulty determination arrangement 428. Inputs 820a-p generally relate to a breadth and depth of a scene, as well as other parameters that generally describe or characterize a respective scene to be scored. Inputs 820a-p associated with a scene may include, but are not limited to, a number of static agents 820a, a number of vulnerable road users 820b, a number of moving vehicles or agents 820c, a minimum distance to an ego vehicle 820d, a maximum path driven curvature 820e, a maximum number of lane crossings or parallel lanes 820f, a maximum speed 820g of the autonomous (ego) vehicle, a minimum TTC 820h, a maximum DRAC 820i, and/or a maximum yaw rate 820p. It should be appreciated that some of these inputs 820a-p may be in a form of absolute values. Some examples of the inputs 820a-p which are absolute values include, but are not limited to, maximum path driven curvature 820e, maximum DRAC 820i, and maximum yaw rate 820p. Other ones of the inputs 820a-p may be in a form of inverted values. Some examples of the inputs 820a-p that are inverted values may include, but are not limited to, minimum distance to an ego vehicle 820d and minimum TTC 820h. By using some absolute values and some inverted values for the inputs 820a-p, the scoring function 810 may effectively be convex and, as such, a direction of substantially increased difficulty may essentially be the same across attributes/complexity parameters/attributes.

Number of static agents 820a may relate to how many stationary or non-moving agents, e.g., parked cars or foreign object debris, are present in a scene. Number of vulnerable road users 820b may relate to how many road users are in the scene and are not vehicles. Number of moving vehicles or agents 820c may relate to vehicles or other agents which are in the scene. Minimum distance to an ego (autonomous) vehicle 820d may relate to the shortest distance between the autonomous vehicle and a nearest object, e.g., a nearest agent or user. Maximum path driven curvature 820e may relate to a substantially maximum road curvature, and may affect how aggressively an autonomous vehicle may have to drive. Typically, a more curved or drastic curvature may result in an autonomous vehicle having to make a relatively drastic or aggressive maneuver. Maximum number of lane crossings or parallel lanes 820f may relate to how many lanes an autonomous vehicle, or another road user, may cross over or maneuver into. Maximum speed 820g of autonomous vehicle may relate to how fast the ego vehicle may safely travel given conditions associated with the scene. Minimum TTC 820h and maximum DRAC 820i may relate to how soon a collision of an autonomous vehicle with an object in the scene may occur and how quickly the autonomous vehicle may realistically stop to avoid a collision, respectively. Maximum yaw rate 820p may relate to a substantially maximum amount of yaw that the autonomous vehicle may sustain.

In one example embodiment, weights applied by the scoring function 810 may be calibrated such that each of the complexity inputs 820a-p affects the resulting complexity score 830 (score) as proportionally as possible. The complexity score 830 may be an actual value, a percentage, etc.

In one example, weights are tuned such that maximum path driven curvature 820e is scaled higher than the maximum speed 820g because the value of the curvature is relatively small compared to a maximum speed of the autonomous vehicle. The amount of scaling may be based on a range and include a value, a percentage, and a score limit.

Complexity scores such as the score 830 are then used to characterize the scene into one or more subsets. An autonomous driving system may then be tested using on a subset of scenes selected based on a complexity score and/or complexity score range.

FIG. 9 is a view illustrating complexity score ranges 900 for characterizing scenes, according to an example embodiment.

In one example, the scoring function 810 calculates a score 830 in a form of a scalar value approximately 0 to 100. Based on the complexity score, the scenes may be characterized into various categories. For example, a nominal category 910 (easy scene subset) for the scenes with calculated complexity score below 33, challenge category 920 (medium complexity scene subset) for the scenes with calculated complexity score between 33 to 66, and a complicated category 930 (very complicated scene subset) for the scenes with calculated complexity score more than 66.

Figure 10B:
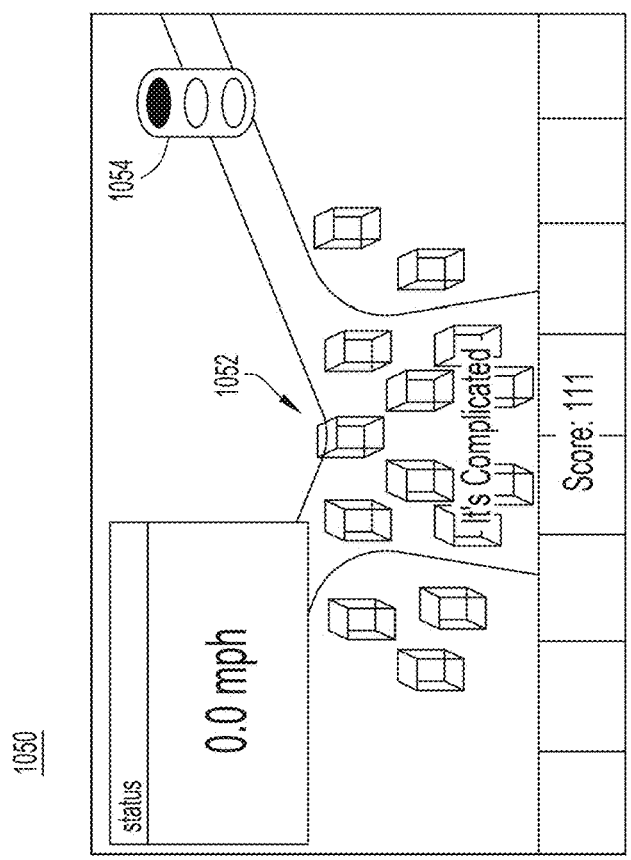
FIGS. 10A and 10B are views illustrating a nominal scene and a complicated scene, respectively, according to various example embodiments.
Figure 10A:
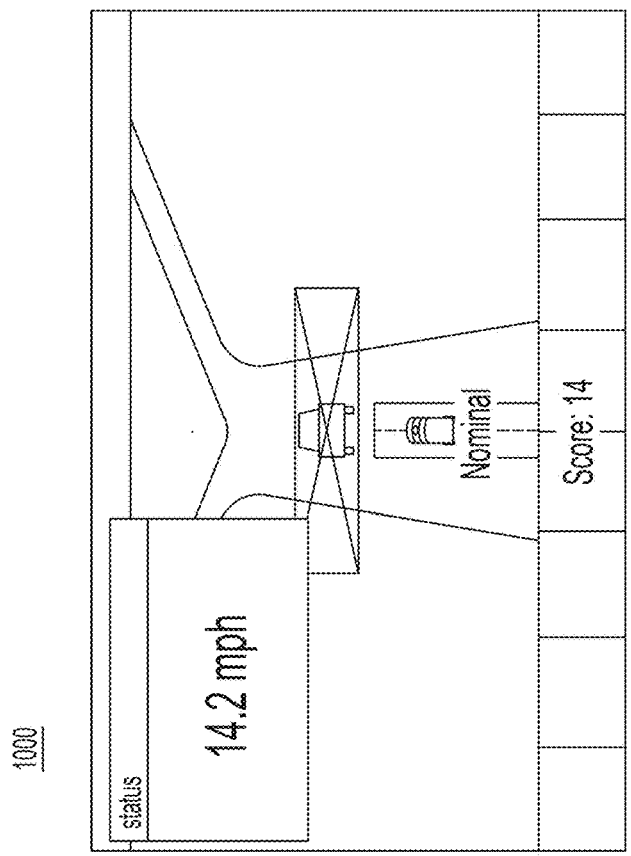

FIGS. 10A and 10B are views illustrating a nominal scene 1000 and a complicated scene 1050, respectively, according to various example embodiments.

In FIG. 10A, the nominal scene 1000 includes a calculated complexity score 14 and is substantially an empty road with no agents detected by the breadth/context determination arrangement 424. The autonomous driving system needs to maneuver the vehicle to proceed along the path at a particular speed. In other words, the complexity of the scene is nominal based on scene attributes and at least one maneuver required by the autonomous driving system, as reflected by the calculated complexity score 14.

On the other hand, in FIG. 10B, the complicated scene 1050 includes multiple agents 1052 of various types. The complicated scene 1050 further includes a traffic light (TL) intersection 1054. The autonomous driving system needs to maneuver the vehicle to avoid various agents 1052, wait for a green light at the TL intersection 1054, etc. In other words, the complicated scene 1050 has high complexity based on scene attributes and number of agents therein and maneuvers required by the autonomous driving system, as reflected by the calculated complexity score 111, which may be scaled down to 100.

Figure 11A:
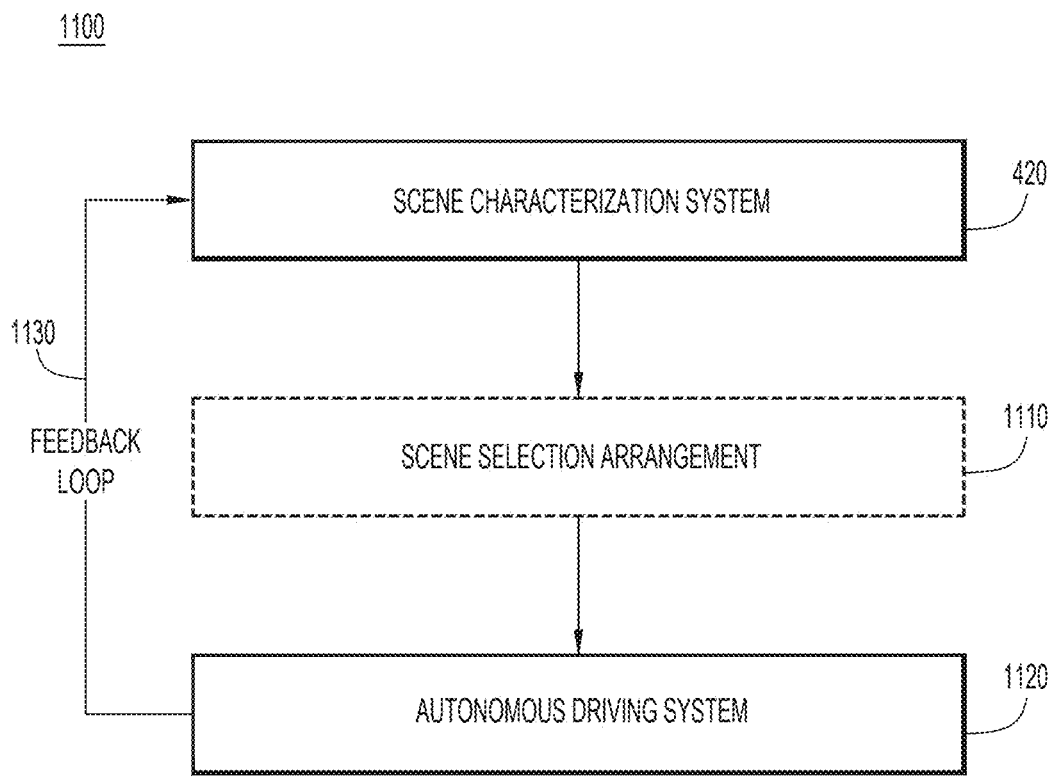
FIG. 11A is a flow diagram illustrating a validation system for validating autonomous driving system based on characterized scenes, according to an example embodiment.

FIG. 11A is a flow diagram illustrating a validation system 1100 for validating autonomous driving system based on characterized scenes, according to an example embodiment. Validation system 1100 for validating an autonomous driving system includes scene characterization system 420 of FIG. 4, scene selection arrangement 1110, and an autonomous driving system 1120.

Scene characterization system 420 characterizes a plurality of scenes by determining complexity of each of the plurality of scenes based on attributes of the respective scene and at least one maneuver required by the autonomous driving system 1120 and calculating a respective complexity score based on the determined complexity of the respective scene, for example, as described with reference to FIGS. 4-9.

Scene selection arrangement 1110 may be an optional component that obtains a set or subset of scenes based on the complexity score calculated by the scene characterization system 420. In one example, scene selection arrangement 1110 may obtain user input via a user interface that includes a score range e.g., scenes with complexity score above 66. Scene selection arrangement 1110 then requests, from the scene characterization system 420 and/or the scene database 410, a subset of scenes with the complexity score above the score range that is input by the user. Scene characterization system 420 and/or the scene database 410 provides and/or causes a subset of scenes to be provided to autonomous driving system 1120 for validation. In general, a filter that is used to enable scene selection arrangement 1110 to select suitable or desired scenes may be configured based upon the requirements associated with the validation system 1100, explained in further detail below.

Autonomous driving system 1120 obtains a subset of the plurality of scenes from the scene characterization system 420 and/or scene selection arrangement 1110 and controls/drives the vehicle through the subset of the selected scenes. Performance of the autonomous driving system 1120 is tested using the subset of the selected scenes. Testing autonomous driving system 1120 may take a long time (hours, days) to ensure that it meets a predetermined safety standard (e.g., x % of scenes without a collision). By selecting a complex subset of scenes based on a complexity score above a predetermined value, testing may be performed faster. That is, the autonomous driving system 1120 may be validated faster using the subset of the plurality of scenes selected based on the complexity score. Autonomous driving system 1120 may be determined to be ready for deployment based on autonomous driving system 1120 driving the autonomous vehicle through the selected subset of scenes without collision.

Moreover, a feedback loop 1130 may be implemented to modify the complexity score assigned to one or more scenes. Specifically, based on performance of autonomous driving system 1120 through one or more of the selected scenes, the complexity score may be adjusted. For example, if the autonomous driving system 1120 cannot control the vehicle to avoid a collision in the first scene, the complexity score of the first scene may be increased. If the autonomous driving system 1120 repeatedly fails to avoid a collision in the first scene, the complexity score may be increased further. In short, the autonomous driving system 1120 provides its performance in the first scene to the scene characterization system 420 via feedback loop 1130.

Scene characterization system 420 analyzes performance of the autonomous driving system in the first scene and may adjust the complexity score of the first scene based on whether the autonomous driving system 1120 drove the vehicle through the first scene without collision. Moreover, scene characterization system 420 may analyze circumstance of the collision such as which type of agents were involved, road conditions, number of agents, etc. Based on circumstances of the collision, scene characterization system 420 may adjust a respective weight assigned to one or more of the characteristics (or agents) in the first scene.

Figure 11B:
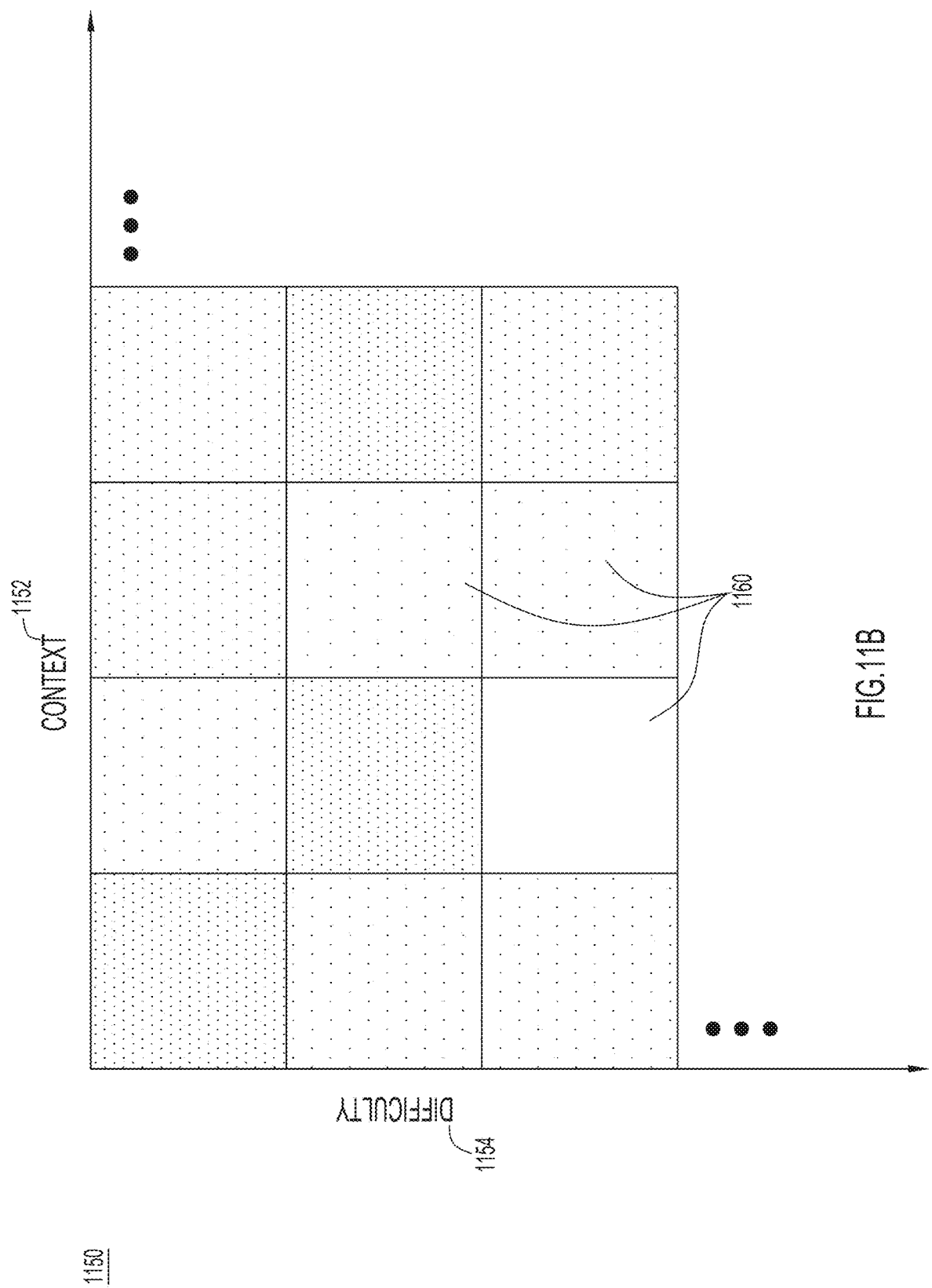
FIG. 11B is a diagram illustrating a complexity coverage map, according to an example embodiment.

With continued reference to FIG. 11A, FIG. 11B is a diagram illustrating a complexity coverage map 1150, according to an example embodiment. Using scene characterization system 420, performance of the autonomous driving system 1120 may be evaluated not only faster (by selecting a set of complicated scenes based on complexity scores) but also more precisely by avoiding gaps (missing scenes) in testing/validating.

As the autonomous driving system 1120 is being tested, the validation system 1100, by using, for example, scene characterization system 420 may generate a complexity coverage map 1150. The complexity coverage map 1150 enables comprehension of scenes that were tested and missing types of scenes (that were not tested). The complexity coverage map 1150 includes context 1152 (conflict events) that were tested by autonomous driving system 1120 and includes difficulty 1154 (number of agents, closeness to the vehicle, etc.) that was encountered by autonomous driving system 1120. Opacity in the complexity coverage map 1150 may indicate density of scenes satisfying a preset criterion. The complexity coverage map 1150 indicates contextual coverage versus difficulty level for a plurality of scenes driven by the vehicle using autonomous driving system 1120.

Using the complexity coverage map 1150, the scene characterization system 420 may identify or detect one or more gaps 1160 (missing types of scenes) and obtain scenes from the scene database 410 to fill in the one or more gaps 1160 in the complexity coverage map 1150 and provide these scenes to autonomous driving system 1120 for testing and validation.

One or more gaps 1160 may represent a missing scene or scene that was not tested such as the autonomous driving system 1120 did not encountered a scene with a pedestrian when two or more agents are present in the scene. As another example, the one or more gaps 1160 may indicate that the autonomous driving system 1120 did not encounter a scene with multiple agents at a 4-way intersection, etc.

Using the complexity coverage map 1150, a set of complicated scenes with a particular context 1152 and difficulty 1154 may be selected to fill in the gaps (identify missing scenes) and ensure that testing of autonomous driving system is comprehensive and includes various contents and difficulty levels.

Figure 12:
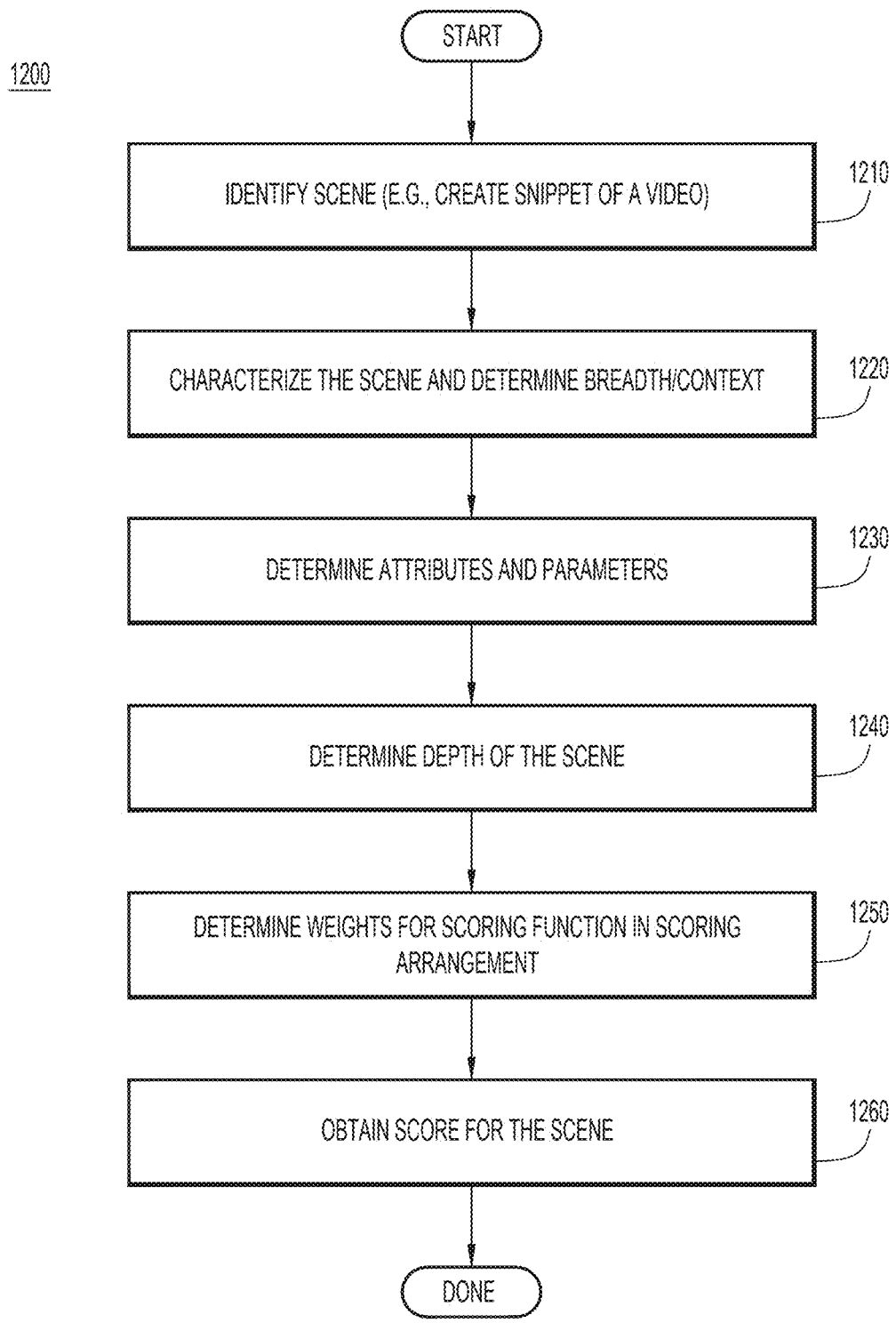
FIG. 12 is a flow chart illustrating a method of characterizing a scene, according to an example embodiment.

FIG. 12 is a flow chart illustrating a method 1200 of characterizing a scene, according to an example embodiment. The method 1200 may be performed by a system 400 of FIG. 4 and/or a computing device such as the one described in FIG. 15.

Characterizing the scene may include analyzing or otherwise processing the scene to determine attributes and/or parameters including attributes or parameters associated with a breadth and/or a depth of the scene.

The method 1200 begins at 1210, in which a scene is effectively identified. In one embodiment, a snippet of a video, e.g., a video of an environment in which a vehicle may travel or a simulated video of an environment in which an autonomous vehicle may travel, is created. The length of a scene or a snippet may generally vary widely. For example, a scene or a snippet may have a length in a range of approximately fifteen seconds to approximately twenty-five seconds. It should be appreciated that a length of a scene or a snippet is not limited to being in a range of approximately fifteen seconds to approximately twenty-five seconds.

The scene identified at 1210, is characterized to obtain attributes or parameters at 1220. That is, a breadth and context associated with the scene may be determined. The breadth and context of the scene may generally include, but are not limited to, ODD 510, OEDR 520, and Maneuvers 530 of FIG. 5.

At 1230, other attributes and parameters in the scene are determined and may include, but not limited to, one or more of maximum speed, minimum TTC, and/or maximum DRAC of FIG. 6.

At 1240, depth associated with the scene is determined. The depth includes, but not limited to, traffic participant measures 710 and/or maneuver measures 720 of FIG. 7.

The method 1200 may involve an optional operation at 1250, in which weights for a scoring function associated with a scoring arrangement are determined e.g., using the feedback loop 1130 of FIG. 11. Determining weights may be optional, as weights may be predetermined. In general, weights are configured based upon the relative importance of various parameters, and the relative importance may vary depending at least in part upon requirements associated with an autonomous driving system being evaluated using the scene.

At 1260, the attributes or parameters are provided to a scoring arrangement such as scoring arrangement 430 of FIG. 4. Then, at 1260, the attributes or parameters are used to obtain a score for the scene. To obtain a complexity score, the attributes or parameters may be provided as input to a scoring function associated with the scoring arrangement. After the score is obtained, the method of processing a scene or a scenario is completed.

Figure 13:
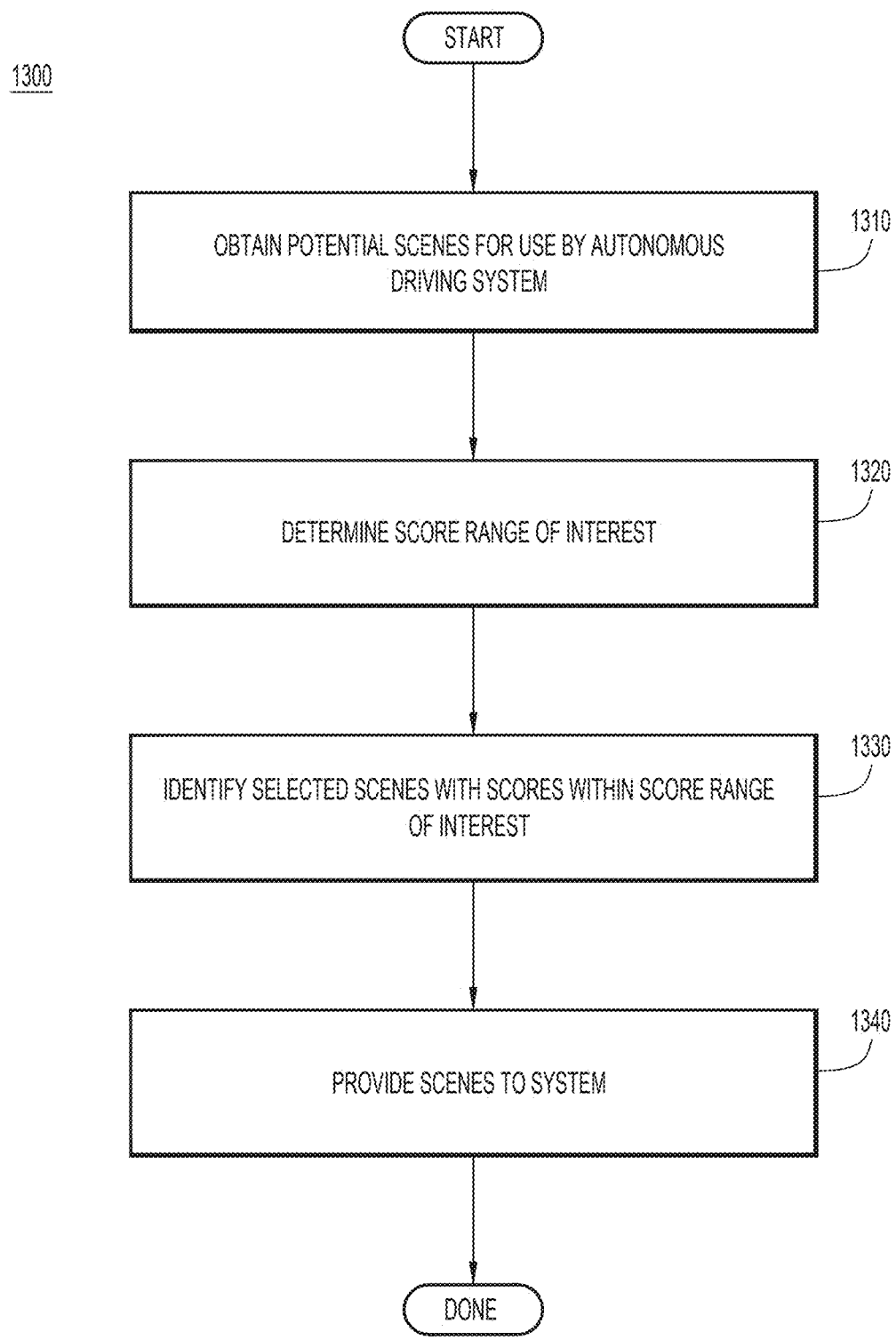
FIG. 13 is a flow chart illustrating a method of identifying scenes for use by a system such as an autonomous driving system, according to an example embodiment.

As previously mentioned, scenes may be used to effectively test an autonomous driving system 1120 of FIG. 11. FIG. 13 is a flow chart illustrating a method 1300 of identifying scenes for use by a system such as an autonomous driving system, according to an example embodiment. The method 1300 may be performed by a validation system 1100 of FIG. 11 and/or a computing device such as the one described in FIG. 15.

The method 1300 begins at 1310 of identifying and obtaining scenes for use by an autonomous driving system such as the autonomous driving system 1120 of FIG. 11. In one example, the potential scenes may be obtained by a scene selection arrangement such as scene selection arrangement 1110 of FIG. 11A.

Once potential scenes are obtained, a range of interest for complexity scores to be provided to the system are determined at 1320. The range of interest may generally indicate a level of difficulty or complexity that is desired for use with the system. By way of example, when scenes are scored between zero and one hundred with one hundred being the highest level of difficulty, the range of interest for a scene score may be in a range of between approximately fifty and approximately one hundred when selecting relatively difficult or complex scenes.

After the range of interest for scores is determined, the method 1300 moves to 1330, in which scenes with scores which fall within the range of interest for scores are identified. Upon selecting scenes which effectively meet desired criteria, e.g., scenes with scores which substantially fall within the range of interest identified at 1320, the scenes are provided to the system at 1340. The system, as discussed above, may be the autonomous driving system 1120 of FIG. 11 such as an autonomy system and/or a simulation system. The method of identifying scenes to provide to a system is completed upon providing scenes to the autonomous driving system.

In the techniques presented above, scenes may be characterized based on their complexities and scenes with various complexities may be selected and used to validate autonomous driving systems. The scenes may be characterized in terms of a breadth and a depth, e.g., a context and a difficulty level. Once a scene is characterized, a scoring function may be used to generate a complexity score for the scene. Using the complexity score enables a selection to be made for scenes of certain levels when evaluating autonomous driving systems for performance and validating for deployment. Using characterization of the scenes in terms of breadth and depth, enhances the ability for autonomous driving systems to be evaluated for different types of exposures. As a result, assessments relating to the coverage of ODDs and the exposure to ODD-related risks may effectively be made.

Figure 14:
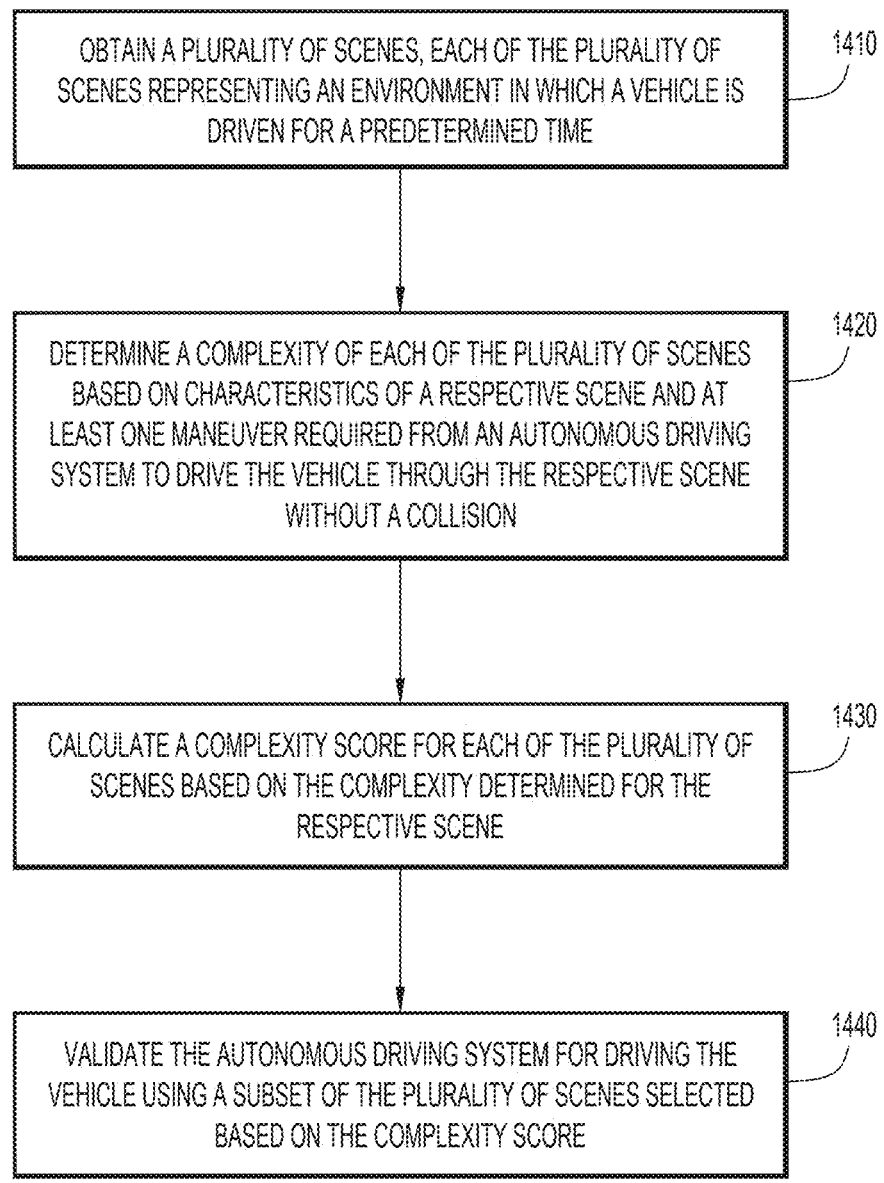
FIG. 14 is a flow chart depicting, at a high-level, operations of validating an autonomous driving system for driving an autonomous vehicle using scenes selected based on a complexity score, according to an example embodiment.

FIG. 14 is a flow chart depicting a method 1400 of validating an autonomous driving system for driving an autonomous vehicle using scenes selected based on a complexity score, according to one example embodiment. The method 1400 may be performed by a computing device such as a computing device 1500 of FIG. 15, detailed below.

The method 1400 begins at 1410, in which a computing device obtains a plurality of scenes. Each of the plurality of scenes represents an environment in which a vehicle is driven for a predetermined time.

At 1420, the computing device determines a complexity of each of the plurality of scenes based on characteristics of a respective scene and at least one maneuver required from an autonomous driving system to drive the vehicle through the respective scene without a collision.

At 1430, the computing device calculates a complexity score for each of the plurality of scenes based on the complexity determined for the respective scene, and at 1440, the computing device validates the autonomous driving system for driving the vehicle using a subset of the plurality of scenes selected based on the complexity score.

In one or more example embodiments, the operation 1440 of validating the autonomous driving system may include selecting a subset of scenes from the plurality of scenes based on respective complexity scores of the subset of scenes and determining whether the autonomous driving system is ready for deployment based on whether the autonomous driving system drives the vehicle through the subset of scenes without collision.

In one instance, selecting the subset of scenes may include obtaining a score range input from a user and selecting the subset of scenes that have the respective complexity scores within the score range input by the user.

In another instance, the method 1400 may further include adjusting the complexity score for a first scene in the subset of scenes based on whether the autonomous driving system drives the vehicle through the first scene without collision.

In one form, adjusting the complexity score for the first scene may include adjusting a respective weight assigned to one or more of the characteristics in the first scene.

According to one or more example embodiments, the operation 1440 of validating the autonomous driving system may include selecting a set of complicated scenes from the plurality of scenes based on respective complexity scores and evaluating the performance of the autonomous driving system in the set of complicated scenes.

In another form, the operation 1420 of determining the complexity of each of the plurality of scenes may include determining a contextual arrangement for the respective scene. The contextual arrangement may include one or more of: an operational design domain (ODD), an object and event detection and response (OEDR), and the at least one maneuver made by the autonomous driving system to drive the vehicle in the respective scene.

In one instance, the ODD may relate to attributes of a road on which the vehicle is driven using the autonomous driving system. The OEDR may relate to whether one or more agent types are present in the respective scene.

In yet another form, the operation 1420 of determining the complexity of each of the plurality of scenes may further include determining difficulty of the respective scene based on one or more of: a number for each of the one or more agent types determined to exist in the respective scene, a distance between the vehicle and one or more agents in the respective scene, and at least one measure value of the at least one maneuver to be made by the vehicle controlled by the autonomous driving system in the respective scene.

According to one or more example embodiments, the operation 1420 of determining the complexity of each of the plurality of scenes may further determining a behavior of each of the one or more agents in the respective scene, determining a minimum time to collision (TTC) to each of the one or more agents, determining a maximum deceleration required to avoid the collision (DRAC) with each of the one or more agents and calculating the at least one measure value of the at least one maneuver to be made by the vehicle controlled by the autonomous driving system in the respective scene, based on the behavior of each of the one or more agents, the TTC, and the DRAC.

According to one or more example embodiment, the operation 1430 of calculating the complexity score may include generating a coverage map for evaluating performance of the autonomous driving system. The coverage map may indicate contextual coverage versus the difficulty for the plurality of scenes driven by the vehicle using the autonomous driving system. The operation 1430 of calculating the complexity score may further include detecting whether one or more gaps in the coverage map exist. The one or more gaps may represent at least one missing scene type that the vehicle did not drive using the autonomous driving system. The operation 1430 of calculating the complexity score may further include configuring the vehicle to drive, using the autonomous driving system, at least one additional scene to fill in the one or more gaps.

Although only a few embodiments have been described in this disclosure, it should be understood that the disclosure may be embodied in many other specific forms without departing from the spirit or the scope of the present disclosure. By way of example, attributes or characteristics of scenes have been described as including some maximum and minimum values such as a minimum TTC and/or a maximum DRAC. In general, values used to characterize scenes may vary widely, and may include values that are not maximum and minimum values.

When a characterized scene is stored in a database, the scene may be indexed using an associated score such that the scene may be located and retrieved, e.g., for purposes of being provided to a system (autonomous driving system) such as the autonomy system or a simulation system. The characterized scenes may generally be indexed using substantially any criteria. For instance, indexing may be accomplished using both a depth and a breadth. In general, indexing may be accomplished using substantially any characteristics of a scene.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Figure 15:
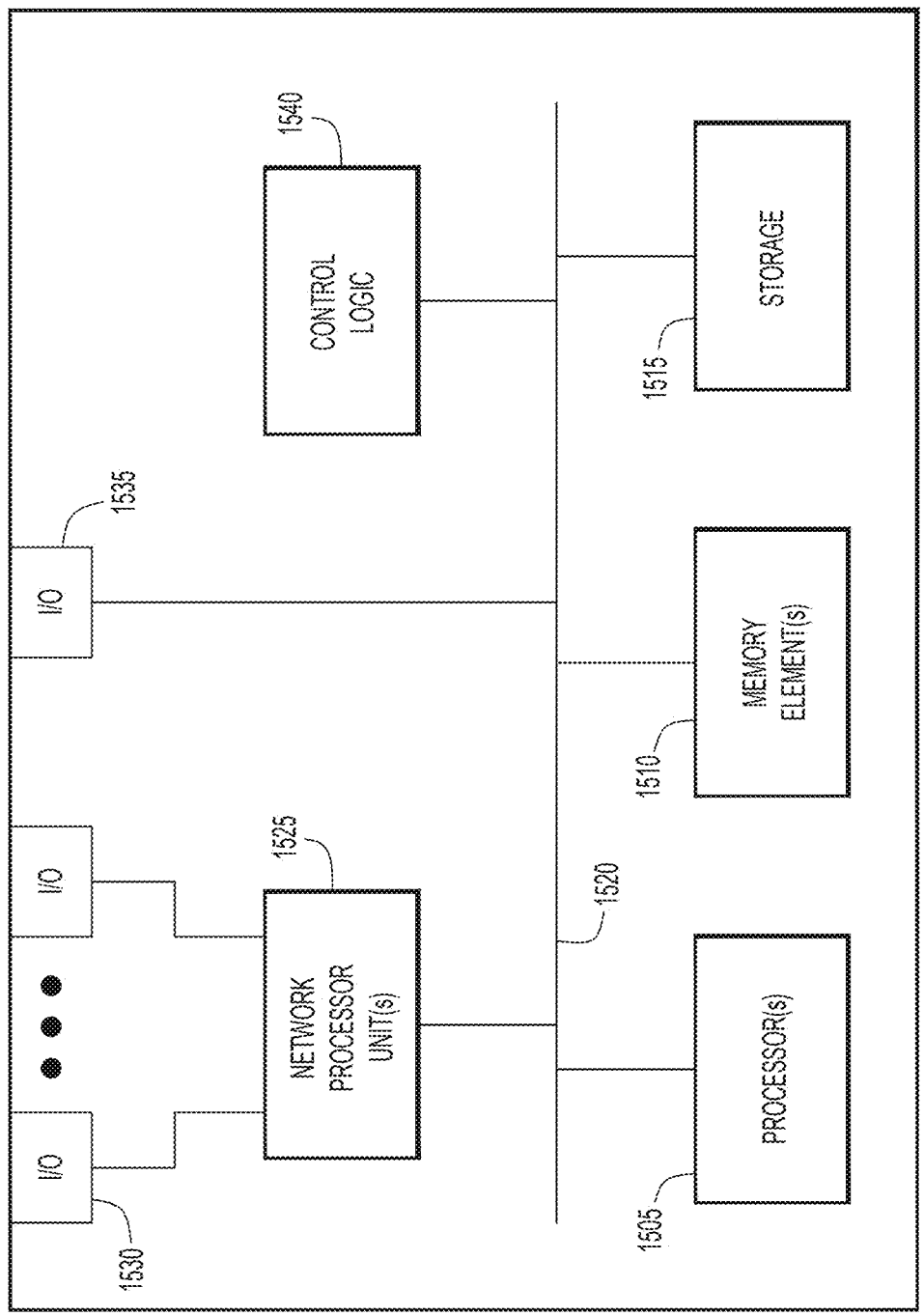
FIG. 15 is a block diagram of a computing device configured to perform functions associated with the techniques described herein, according to one or more example embodiments.

Referring now to FIG. 15, FIG. 15 illustrates a hardware block diagram of a computing device 1500 configured to perform functions associated with the techniques described herein and depicted in FIGS. 4-14, according to one or more example embodiments. The computing device 1500 may perform the functions of the autonomy system testing of FIG. 11A.

In various example embodiments, a computing device, such as computing device 1500 or any combination of computing devices, may be configured as any entity/entities as discussed for the techniques depicted in connection with FIGS. 1-14 in order to perform operations of the various techniques discussed herein.

In at least one embodiment, computing device 1500 may include one or more processor(s) 1505, one or more memory element(s) 1510, storage 1515, a bus 1520, one or more network processor unit(s) 1525 interconnected with one or more network input/output (I/O) interface(s) 1530, one or more I/O interface(s) 1535, and control logic 1540. In various embodiments, instructions associated with logic for computing device 1500 can overlap in any manner and are not limited to the specific allocation of instructions and/or operations described herein.

In at least one embodiment, processor(s) 1505 is/are at least one hardware processor configured to execute various tasks, operations and/or functions for computing device 1500 as described herein according to software and/or instructions configured for computing device. Processor(s) 1505 (e.g., a hardware processor) can execute any type of instructions associated with data to achieve the operations detailed herein. In one example, processor(s) 1505 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1510 and/or storage 1515 is/are configured to store data, information, software, and/or instructions associated with computing device 1500, and/or logic configured for memory element(s) 1510 and/or storage 1515. For example, any logic described herein (e.g., control logic 1540) can, in various embodiments, be stored for computing device 1500 using any combination of memory element(s) 1510 and/or storage 1515. Note that in some embodiments, storage 1515 can be consolidated with memory element(s) 1510 (or vice versa), or can overlap/exist in any other suitable manner.

In at least one embodiment, bus 1520 can be configured as an interface that enables one or more elements of computing device 1500 to communicate in order to exchange information and/or data. Bus 1520 can be implemented with any architecture designed for passing control, data and/or information between processors, memory elements/storage, peripheral devices, and/or any other hardware and/or software components that may be configured for computing device 1500. In at least one embodiment, bus 1520 may be implemented as a fast kernel-hosted interconnect, potentially using shared memory between processes (e.g., logic), which can enable efficient communication paths between the processes.

In various embodiments, network processor unit(s) 1525 may enable communication between computing device 1500 and other systems, entities, etc., via network I/O interface(s) 1530 to facilitate operations discussed for various embodiments described herein. In various embodiments, network processor unit(s) 1525 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1530 can be configured as one or more Ethernet port(s), Fibre Channel ports, and/or any other I/O port(s) now known or hereafter developed. Thus, the network processor unit(s) 1525 and/or network I/O interfaces 1530 may include suitable interfaces for receiving, transmitting, and/or otherwise communicating data and/or information in a network environment.

I/O interface(s) 1535 allow for input and output of data and/or information with other entities that may be connected to the computing device 1500. For example, I/O interface(s) 1535 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1540 can include instructions that, when executed, cause processor(s) 1505 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1540) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1510 and/or storage 1515 can store data, software, code, instructions (e.g., processor instructions), logic, parameters, combinations thereof, and/or the like used for operations described herein. This includes memory element(s) 1510 and/or storage 1515 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in one form, an apparatus is provided such as the computing device 1500. The apparatus includes a memory, a network interface configured to enable network communications, and a processor. The processor is configured to perform operations, which include obtaining a plurality of scenes. Each of the plurality of scenes represent an environment in which a vehicle is driven for a predetermined time. The operations further include determining a complexity of each of the plurality of scenes based on characteristics of a respective scene and at least one maneuver required from an autonomous driving system to drive the vehicle through the respective scene without a collision and calculating a complexity score for each of the plurality of scenes based on the complexity determined for the respective scene. The operations further include validating the autonomous driving system for driving the vehicle using a subset of the plurality of scenes selected based on the complexity score.

In another form, one or more non-transitory computer readable storage media are provided encoded with instructions that, when executed by at least one processor, cause the processor to execute a method including obtaining a plurality of scenes. Each of the plurality of scenes represents an environment in which a vehicle is driven for a predetermined time. The method further includes determining a complexity of each of the plurality of scenes based on characteristics of a respective scene and at least one maneuver required from an autonomous driving system to drive the vehicle through the respective scene without a collision and calculating a complexity score for each of the plurality of scenes based on the complexity determined for the respective scene. The method further includes validating the autonomous driving system for driving the vehicle using a subset of the plurality of scenes selected based on the complexity score.

In yet another form, a system or systems are provided that include the components, modules, and operations explained above with reference to FIGS. 1-15.

The steps or operations associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a computing device, a plurality of scenes, each of the plurality of scenes representing an environment in which a vehicle is driven for a predetermined time;
   determining, by the computing device, a complexity of each of the plurality of scenes based on characteristics of a respective scene and at least one maneuver required from an autonomous driving system to drive the vehicle through the respective scene without a collision;
   calculating, by the computing device, a complexity score for each of the plurality of scenes based on the complexity determined for the respective scene;
   validating, by the computing device, the autonomous driving system for driving the vehicle using a subset of the plurality of scenes selected based on the complexity score and by generating a coverage map that maps contextual coverage versus a difficulty level for the plurality of scenes driven by the vehicle using the autonomous driving system and that includes a density for the plurality of scenes and by determining one or more missing types of scenes that are omitted in validating the autonomous driving system based on the density in the coverage map; and
   based on the autonomous driving system being validated, deploying the autonomous driving system in the vehicle and controlling driving operations of the vehicle.

2. The method of claim 1, wherein the coverage map includes an opacity that is indicative of the density of a set of scenes satisfying a present criterion.

3. The method of claim 1, further comprising:
   obtaining a score range input from a user; and
   selecting the subset of the plurality of scenes that have respective complexity scores within a predetermined score range that matches the score range input by the user.

4. The method of claim 1, further comprising:
   adjusting the complexity score for a first scene in the subset of the plurality of scenes based on whether the autonomous driving system drives the vehicle through the first scene without the collision.

5. The method of claim 4, wherein adjusting the complexity score for the first scene includes:
   adjusting a respective weight assigned to one or more of the characteristics in the first scene.

6. The method of claim 1, wherein validating the autonomous driving system includes:
   selecting a set of complicated scenes from the plurality of scenes based on respective complexity scores being above a predetermined score range that defines a high complexity level within a respective scene; and
   evaluating performance of the autonomous driving system in the set of complicated scenes.

7. The method of claim 1, wherein determining the complexity of each of the plurality of scenes includes:
   determining a contextual arrangement for the respective scene, wherein the contextual arrangement includes one or more of: an operational design domain (ODD), an object and event detection and response (OEDR), and the at least one maneuver made by the autonomous driving system to drive the vehicle in the respective scene.

8. The method of claim 7, wherein the ODD relates to attributes of a road on which the vehicle is driven using the autonomous driving system and wherein the OEDR relates whether one or more agent types are present in the respective scene.

9. The method of claim 8, wherein determining the complexity of each of the plurality of scenes further includes:
   determining difficulty of the respective scene based on one or more of: a number for each of the one or more agent types determined to exist in the respective scene, a distance between the vehicle and one or more agents in the respective scene, and at least one measure value of the at least one maneuver to be made by the vehicle controlled by the autonomous driving system in the respective scene.

10. The method of claim 9, wherein determining the complexity of each of the plurality of scenes further includes:
    determining a behavior of each of the one or more agents in the respective scene;
    determining a minimum time to collision (TTC) to each of the one or more agents;
    determining a maximum deceleration required to avoid the collision (DRAC) with each of the one or more agents; and
    calculating the at least one measure value of the at least one maneuver to be made by the vehicle controlled by the autonomous driving system in the respective scene, based on the behavior of each of the one or more agents, the TTC, and the DRAC.

11. The method of claim 1, further comprising: configurating the vehicle to drive using the autonomous driving system at least one additional scene to fill in one or more gaps on the coverage map.

12. The method of claim 1, further comprising:
    categorizing the plurality of scenes into one of a plurality of categories based on the complexity score,
    wherein the plurality of categories includes a nominal category having a first predetermined score range, a challenge category having a second predetermined score range greater than the first predetermined score range, and a complicated category having a third predetermined score range greater than the second predetermined score range.

13. The method of claim 1, wherein validating the autonomous driving system includes:
   determining whether the autonomous driving system is ready for deployment based on whether the autonomous driving system drives the vehicle through the subset of the plurality of scenes without the collision.

14. An apparatus comprising:
   a memory;
   a network interface configured to enable network communications; and
   a processor, wherein the processor is configured to perform operations comprising:
      obtaining a plurality of scenes, each of the plurality of scenes representing an environment in which a vehicle is driven for a predetermined time;
      determining a complexity of each of the plurality of scenes based on characteristics of a respective scene and at least one maneuver required from an autonomous driving system to drive the vehicle through the respective scene without a collision;
      calculating a complexity score for each of the plurality of scenes based on the complexity determined for the respective scene;
      validating the autonomous driving system for driving the vehicle using a subset of the plurality of scenes selected based on the complexity score and by generating a coverage map that maps contextual coverage versus a difficulty level for the plurality of scenes driven by the vehicle using the autonomous driving system and that includes a density for the plurality of scenes and by determining one or more missing types of scenes that are omitted in validating the autonomous driving system based on the density in the coverage map; and
      based on the autonomous driving system being validated, deploying the autonomous driving system in the vehicle and controlling driving operations of the vehicle.

15. The apparatus of claim 14, wherein the processor is configured to validate the autonomous driving system by:
   determining whether the autonomous driving system is ready for deployment based on whether the autonomous driving system drives the vehicle through the subset of the plurality of scenes without collision.

16. The apparatus of claim 15, wherein the processor is further configured to perform:
   obtaining a score range input from a user; and
   selecting the subset of the plurality of scenes that have respective complexity scores within a predetermined score range that matches the score range input by the user.

17. The apparatus of claim 15, wherein the processor is further configured to perform:
   adjusting the complexity score for a first scene in the subset of the plurality of scenes based on whether the autonomous driving system drives the vehicle through the first scene without the collision.

18. The apparatus of claim 14, wherein the processor is configured to validate the autonomous driving system by:
   selecting a set of complicated scenes from the plurality of scenes based on respective complexity scores being above a predetermined score range that defines a high complexity level within a respective scene; and
   evaluating performance of the autonomous driving system in the set of complicated scenes.

19. One or more non-transitory computer readable storage media encoded with instructions that, when executed by a processor, cause the processor to execute a method comprising:
   obtaining a plurality of scenes, each of the plurality of scenes representing an environment in which a vehicle is driven for a predetermined time;
   determining a complexity of each of the plurality of scenes based on characteristics of a respective scene and at least one maneuver required from an autonomous driving system to drive the vehicle through the respective scene without a collision;
   calculating a complexity score for each of the plurality of scenes based on the complexity determined for the respective scene;
   validating the autonomous driving system for driving the vehicle using a subset of the plurality of scenes selected based on the complexity score and by generating a coverage map that maps contextual coverage versus a difficulty level for the plurality of scenes driven by the vehicle using the autonomous driving system and that includes a density for the plurality of scenes and by determining one or more missing types of scenes that are omitted in validating the autonomous driving system based on the density in the coverage map; and
   based on the autonomous driving system being validated, deploying the autonomous driving system in the vehicle and controlling driving operations of the vehicle.

20. The one or more non-transitory computer readable storage media of claim 19, wherein validating the autonomous driving system includes:
   determining whether the autonomous driving system is ready for deployment based on whether the autonomous driving system drives the vehicle through the subset of the plurality of scenes without the collision.

* * * * *